United States Patent
Johar et al.

(10) Patent No.: US 10,630,985 B2
(45) Date of Patent: Apr. 21, 2020

(54) METHOD FOR SCANNING CODING BLOCKS INSIDE A VIDEO FRAME BY VIDEO CODECS

(71) Applicant: Samsung Electronics Co., Ltd., Suwon-si, Gyeonggi-do (KR)

(72) Inventors: Sumit Johar, Noida (JP); Kaushik Saha, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 15/381,977

(22) Filed: Dec. 16, 2016

(65) Prior Publication Data

US 2017/0347099 A1    Nov. 30, 2017

(30) Foreign Application Priority Data

May 27, 2016    (IN) .............................. 201611018237

(51) Int. Cl.
*H04N 19/129*    (2014.01)
*H04N 19/57*    (2014.01)

(52) U.S. Cl.
CPC ........... *H04N 19/129* (2014.11); *H04N 19/57* (2014.11)

(58) Field of Classification Search
None
See application file for complete search history.

(56) References Cited

U.S. PATENT DOCUMENTS

| | | | |
|---|---|---|---|
| 6,735,342 B2 | 5/2004 | Felts et al. | |
| 7,065,252 B1 * | 6/2006 | Malvar | H04N 19/63 358/426.14 |
| 7,873,225 B2 | 1/2011 | Wallace et al. | |

(Continued)

FOREIGN PATENT DOCUMENTS

| | | |
|---|---|---|
| KR | 10-2007-0088140 A | 8/2007 |
| KR | 10-2014-0029533 A1 | 3/2014 |
| WO | 2012/128701 A1 | 9/2012 |

OTHER PUBLICATIONS

Sikora, "Digital Video Coding Standards and Their Role in Video Communications," Signal Processing for Multimedia, 1999, pp. 225-252, J.S. Byrnes (Ed.), IOS Press.

(Continued)

*Primary Examiner* — William C Vaughn, Jr.
*Assistant Examiner* — Joseph Daniel A Towe
(74) *Attorney, Agent, or Firm* — Jefferson IP Law, LLP

(57) ABSTRACT

A method for encoding video and an encoder for encoding video, a method for decoding video and a decoder for decoding video are provided. Accordingly, in one embodiment, a method for decoding video receives a bit-stream including a plurality of data units encoded according to a scan pattern comprising at least one U-pattern, and decodes a data unit among the plurality of data units by using at least one data unit included among the plurality of data units, the at least one other data unit being decoded prior to the data unit according to the scan pattern. When the plurality of data units are included in a data cluster, the method includes scanning the plurality of data units according to the at least one U-pattern, and the scanning includes scanning and decoding the data unit, followed by scanning and decoding a neighboring data unit horizontally or vertically adjacent to the data unit.

15 Claims, 33 Drawing Sheets

(56) References Cited

U.S. PATENT DOCUMENTS

| | | |
|---|---|---|
| 8,848,789 B2 | 9/2014 | Bao |
| 9,491,469 B2 | 11/2016 | Sole Rojals et al. |
| 2003/0007698 A1* | 1/2003 | Govindaswamy ... H04N 19/176 382/250 |
| 2011/0085596 A1* | 4/2011 | Jeong ................... H04N 19/176 375/240.18 |
| 2012/0113326 A1 | 5/2012 | Nagaraja et al. |
| 2014/0341283 A1 | 11/2014 | Choi et al. |
| 2015/0304670 A1* | 10/2015 | Liu ........................ H04N 19/96 375/240.13 |

OTHER PUBLICATIONS

Mitrovic, "Video Compression," Jul. 15, 2012, University of Edinburgh.

International Telecommunication Union, "Information Technology—Generic Coding of Moving Pictures and Associated Audio Information: Video," ITU-T, Telecommunication Standardization Sector of ITU-T, ITU-T Recommendation, Nov. 13, 1994, H.262.

International Telecommunication Union, "Advanced Video Coding for Generic Audiovisual Services," ITU-T Telecommunication Standardization Sector of ITU, Series H: Audiovisual and Multimedia Systems, May 1, 2003, H.264.

Ohm et al., "White Paper on HEVC," International Organization for Standardization, Feb. 2015, ISO/IEC JTC1/SC29/WG11 N15074, Geneva, CH.

McCann et al., "Samsung's Response to the Call for Proposals on Video Compression Technology," Joint Collaborative Team on Video Coding (JCT-VC) of ITU-T SG16 WP3 and ISO/IEC JTC1/SC29/WG11, Apr. 15-23, 2010, JCTVC-A124, Dresden, DE.

Choi et al., "AHG15: Independent Control of Max CU and LCU for small LCU," Joint Collaborative Team on Video Coding (JCT-VC) of ITU-T SG16 WP3 and ISO/IEC JTC1/SC29/WG11, Feb. 1-10, 2012, JCTVC-H0269, San Jose, CA.

\* cited by examiner

FIG. 3B
(PRIOR ART)

| LCU 0 | LCU 2 | LCU 12 | LCU 14 | LCU 24 | LCU 26 | LCU 36 | LCU 38 |
|---|---|---|---|---|---|---|---|
| LCU 1 | LCU 3 | LCU 13 | LCU 15 | LCU 25 | LCU 27 | LCU 37 | LCU 39 |
| LCU 4 | LCU 6 | LCU 16 | LCU 18 | LCU 28 | LCU 30 | LCU 40 | LCU 42 |
| LCU 5 | LCU 7 | LCU 17 | LCU 19 | LCU 29 | LCU 31 | LCU 41 | LCU 43 |
| LCU 8 | LCU 10 | LCU 20 | LCU 22 | LCU 32 | LCU 34 | LCU 44 | LCU 46 |
| LCU 9 | LCU 11 | LCU 21 | LCU 23 | LCU 33 | LCU 35 | LCU 45 | LCU 47 |

FIG. 3C (PRIOR ART)

CODING UNIT (1210)

PREDICTION UNIT (1260)

FIG. 23A

| LCU0 | LCU1 | LCU2 | LCU3 | LCU4 |
|---|---|---|---|---|
| LCU5 | LCU6 | LCU7 | LCU8 | LCU9 |
| LCU10 | LCU11 | LCU12 | LCU13 | LCU14 |
| LCU15 | LCU16 | LCU17 | LCU18 | LCU19 |
| LCU20 | LCU21 | LCU22 | LCU23 | LCU24 |
| LCU25 | LCU26 | LCU27 | LCU28 | LCU29 |

METHOD FOR SCANNING CODING BLOCKS INSIDE A VIDEO FRAME BY VIDEO CODECS

CROSS-REFERENCE TO RELATED APPLICATION(S)

This application claims the benefit under 35 U.S.C. § 119(a) of Indian Provisional application filed on May 27, 2016 in the Indian Patent Office and assigned Serial No. 201611018237, the entire disclosure of each of which is hereby incorporated by reference.

TECHNICAL FIELD

The present disclosure relates to video encoding and decoding.

BACKGROUND

With the development and distribution of hardware capable of reproducing and storing high-resolution or high-quality video content, the need for a video codec capable of effectively encoding or decoding high-resolution or high-quality video content has increased. A standard video codec typically includes an encoder and a decoder. The encoder at a transmitter compresses the video to generate a compressed bit stream. The compressed bit stream also includes control information. The control information comprises information needed to decode the compressed bit stream. The decoder at a receiver receives the compressed bit stream and decodes the compressed bit stream in accordance with the control information, and reconstructs the video from the decoded bit stream.

Generally, each frame in the video is divided into blocks of the same size and each frame is then encoded/decoded block by block. The encoder implements video coding standards, which define a set of tools for encoding the frames. In traditional video coding standards such as MPEG-1, Mpeg-2, and H.264/AVC, the frame is divided into equal sized blocks in order of 16×16 pixels and such blocks are generally referred to as macroblocks. In recent video coding standard like HEVC, the frame is divided into larger sized blocks of up to 64×64 pixels, and they are referred as Coding Units instead of Macroblocks. In the traditional video coding standards, the encoder encodes the macroblocks by scanning the macroblocks from left to right and then from top to bottom. Such a scan order is known as raster scan pattern. Further, motion estimation process is employed for eliminating inter-frame redundancy between successive frames which is achieved by comparing frame data (pixels) of two frames (current and reference frames). However, this process is highly data intensive as it works on pixel data from two frames. Since pixel data for a frame has huge memory footprint, the pixel data is generally stored in external memory. As per requirements, the pixel data is loaded into the cache for processing resulting in high memory bandwidth usage.

Further, for every macroblock in a current frame, a search region surrounding collocated macroblock in a reference frame is searched for the best match. For comparison, this search window is loaded for each macroblock. The search window is pixel data and for a complete frame, this has a huge memory footprint. Since search regions of neighboring macroblocks overlap, therefore only the non-overlapping pixel data corresponding to the search window for the current macroblock is loaded into the cache for processing, thereby resulting in reduced memory bandwidth usage. Accordingly, FIG. 1A illustrates raster scan pattern used in a frame 100 currently being scanned. As described earlier, the frame 100 is divided into a plurality of macroblocks 101 having a size of 64×64 that are scanned using a raster scan pattern 102. For coding each macroblock 101 in current frame 100, a search region 103 (represented by dashed rectangle) having a size of 96×96 surrounding collocated macroblock in the current frame 100 is searched for best match. The spatially adjacent macroblocks have their respective search window overlapped creating an overlap region 104 (represented by solid grey rectangle) having a size of 32×32. Referring to FIG. 1A, macroblocks N, N+1, N+2, N+3, and N+4 are spatially adjacent to each other and therefore their respective search windows overlap. Such an overlap of search region provides memory bandwidth savings between successive macroblocks.

However, with increasing demand for larger frame sizes like high definition (HD) (1920×1080 pixels), 4 k (3840×2160 pixels) and higher frame rates like 60 and 120, the number of macroblocks being processed per second is increasing, thereby increasing the memory bandwidth requirements. The increased memory bandwidth requirement may be met by increasing re-usage of already cached data. One technique to increase the re-use is by increasing size of the cache. However, increasing cache size will increase costs of the entire system.

Another technique to increase the re-use is by using scanning patterns, which enable larger overlap of search regions cached from reference frames. However, the raster scan pattern in traditional video coding standards does not allow overlap of search regions for more than two consecutive macroblocks and therefore results in no search window overlap between successive macroblocks while switching rows at the right frame boundary. Referring to FIG. 1B, macroblock n is on the extreme right edge of the frame 100 and macroblock n+1 is on the extreme left edge of the frame 100. As may be gathered, there is no overlap between their respective search regions 104 while switching rows during the raster scanning.

The above-mentioned deficiencies of the raster scan are overcome in the latest encoding standards. In the latest coding standards, such as HEVC, the frame is divided into equal sized square units in maximum order of 64×64 pixels and such units are generally referred to as Coding Tree Units (CTUs) which are further divided into smaller units called Coding Units (CUs). The Coding Tree Units may also be referred as Largest Coding Units (LCUs). The large size of the CTUs increases coding efficiency while being scanned using the raster scan pattern. To enable large CTUs while keeping the coding performance of small detailed areas in the same image, hierarchical coding is used. Thus, a large size CTU may be further split into smaller size CUs based on a quad-tree structure. Thus, the CTU having a size of 64×64 may be split into CU of smaller sizes 64×64, 32×32, 16×16, and 8×8.

To increase the coding efficiency while having large size CU and to increase the re-use of already cached data, the CUs are scanned in a zigzag pattern or Z-scan pattern horizontally, row by row. Various solutions are available that implement the above-mentioned Z-scan pattern. In one solution, Z-scan blocks including at least four CUs are determined. The Z-scan block size is equal to or smaller than the maximum size of the all the CUs and is larger than the current CU being scanned. As such, the locality of the coded data is increased as the CUs that are scanned subsequently are located adjacent to each other, implying that the prediction is improved. Hence, the coding efficiency is increased. FIG. 2 illustrates Z-scan pattern and Z-scan blocks in a frame 200 currently being scanned in accordance with one embodiment of the solution. As described earlier, the frame 200 is divided into a plurality of LCU 201 having a size of 64×64 that are scanned using a raster scan pattern 102. The LCU 201 is further split into CU 202 having a size of 32×32. Z-scan blocks 203 (represented by bold square) of max size 64×64 equal to size of the LCU 201 max size are determined. Each Z-scan block 203 includes four CUs 202. The Z-scan blocks 203 are scanned horizontally, row by row, by scanning the CU 202 within the Z-scan block 203 in a Z-scan pattern 204.

In another solution, an image is split into LCUs having maximum size as allowed by a video codec and each LCU is further split in a hierarchical structure into CUs having size less than or equal to the size of the LCU. The size of the resultant CUs is determined as having a smallest encoded error by the video codec. Each of the LCU is then scanned using a first scan pattern such as raster scan pattern and each CU within the LCU is then scanned using a second scan pattern such as Zigzag scan pattern. This improves coding efficiency and re-use of cache. Accordingly, FIG. 3A illustrates a zigzag scan pattern of CUs according to size of the CUs in a frame 300 currently being scanned, in accordance with first embodiment the solution. As described earlier, the frame 300 is divided into a plurality of LCUs having maximum size of 64×64, as allowed by the video codec. The frame is split into LCUs having a size of 32×32. Since the LCU has a size of 32×32 that is ½ of the maximum size allowed by video codec, a group of adjacent LCUs, that are horizontally and vertically adjacent such as LCU0, LCU1, LCU2, and LCU3, is assumed such that the combined size of these LCUs is equal to the maximum size allowed. A plurality of such groups of the LCUs is then scanned according to a raster scanning pattern. Within the group, the LCUs are scanned in accordance with a zigzag pattern by scanning four LCUs at a time. Thus, the group of the maximum LCUs comprising LCU0, LCU1, LCU2, and LCU3 and the group of the maximum LCUs comprising LCU4, LCU5, LCU6, and LCU7 are scanned in accordance with raster scan pattern. On the contrary, LCU0, LCU1, LCU2, and LCU3, is scanned according to a zigzag scan pattern and the LCU4, LCU5, LCU6, and LCU7 is scanned according to a zigzag scan pattern.

Similarly, FIG. 3B illustrates a zigzag scan pattern of LCUs according to size of the LCUs in a frame 301 currently being scanned, in accordance with second embodiment the solution.

Further, FIG. 3C illustrates a zigzag scan pattern of LCUs according to size of the LCUs in a frame 302 currently being scanned, in accordance with third embodiment the solution. As described earlier, the frame 302 is divided into a plurality of LCUs having a size of 16×16. Since the LCU has a size of 16×16 that is ¼ of the maximum size allowed by the video codec (64×64), a group of adjacent LCUs, that are horizontally and vertically adjacent such as LCU0 to LCU15, is assumed such that the combined size of these LCUs is equal to the maximum size of LCU allowed. A plurality of such groups of the LCUs is then scanned according to a raster scanning pattern. Within the group, the LCU are scanned in accordance with a zigzag pattern by scanning four LCUs at a time. Thus, the group of the maximum LCUs comprising LCU0 to LCU 15 and the group of the maximum LCUs comprising LCU16 to LCU 31 are scanned in accordance with raster scan pattern. On the contrary, LCU0 to LCU 15 and the LCU16 to LCU 31, are scanned according to a zigzag scan pattern by scanning each four LCUs at a time in a zigzag pattern. In other words, LCU0 to LCU 3 is first scanned in a zigzag pattern, then LCU4 to LCU 7 is scanned in a zigzag pattern, then LCU8 to LCU 11 is scanned in a zigzag pattern, and finally LCU8 to LCU 15 is scanned in a zigzag pattern.

Thus, Z-scan pattern or zigzag pattern enables larger overlap of cached search region in comparison to raster scan pattern as the Z-scan pattern enables overlap with multiple CUs surrounding a current CU. However, Z-scan pattern can lead to lower overlap in case the cache is capable of storing single CU's search window only. FIGS. 4A and 4B illustrate a zigzag scan pattern of CUs in a frame 400. As described earlier, the frame 400 is divided into a plurality of CUs 401 that are scanned using a Z-scan pattern 402. For coding each CU 401, a search region 403 (represented by dashed rectangle) surrounding collocated CUs 401 in the current frame 400 is searched for best match. As may be observed from FIGS. 4A and 4B, overlap between the search regions 403 between CUs N and N+1 is similar to raster scan whereas the overlap between the search regions 403 between CUs N+1 and N+2 is lesser. Similar loss in overlap region is present while moving from CU N+3 to next CU.

Further, the Z-scan pattern results in no search window overlap between successive Z-blocks while switching rows at right frame boundary similar to raster scan pattern, as may be observed from FIGS. 2, 3A, and 3C. Furthermore, one Z-block contains only four CUs, which is fixed, thereby limiting the overlapping.

In one another solution, massive digital holograms indicated as a fringe pattern are efficiently encoded by using an existing video/image compression tool when a 3D image is made by using a CGH (Computer Generated Hologram). The digital hologram encoding process comprises the pre-processing, the division (Segmentation), the frequency conversion (Transform), the post-process (Post-Processing), and the compression stages. As illustrated in FIG. 5A, the fringe is divided into blocks holding the full information about the object video by using 2D DCT transformation. Each of these blocks is treated as separate video frames and prediction blocks are obtained from neighboring blocks. This achieves the compression of the holograms. The video frames are then scanned using MPEG and JPEG standards such as raster scanning pattern, scanning from top-most to the bottom-most blocks, and vice versa. Accordingly, FIG. 5B illustrates a scanning pattern from top-most to the bottom-most blocks. The scanned video frames are then put in order to form a video stream. As may be observed from the figure, such scanning results in lesser search window overlap between successive blocks in a manner similar to raster scanning.

Thus, there is a need for a better solution to overcome above-mentioned deficiencies.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter.

In accordance with the purposes of the present disclosure, the present disclosure as embodied and broadly described herein, provides for method and encoder for encoding video, and method and decoder for decoding video.

Accordingly, in one aspect of the embodiment, a method in a video decoder receives a bit-stream including a plurality of data units encoded according to a scan pattern comprising at least one U-pattern; and decodes a data unit among the plurality of data units by using at least one data unit included among the plurality of data units, the at least one other data unit being decoded prior to the data unit according to the scan pattern. When the plurality of data units are included in a data cluster, the method includes scanning the plurality of data units according to the at least one U-pattern, and the scanning includes scanning and decoding the data unit, followed by scanning and decoding a neighboring data unit horizontally or vertically adjacent to the data unit. When an image is divided into a plurality of data clusters including the data cluster, the method includes scanning the plurality of data clusters according to the at least one U-pattern, wherein the data cluster is scanned and decoded, followed by a neighboring data cluster horizontally or vertically adjacent to the data cluster.

Accordingly, in one aspect of the embodiment, a video decoding apparatus comprises a receiver configured to receive a bit-stream including a plurality of data units encoded according to a scan pattern comprising at least one U-pattern; and a decoder configured to decode a data unit among the plurality of data units by using at least one data unit included among the plurality of data units, the at least one other data unit being decoded prior to the data unit according to the scan pattern. Wherein, when the plurality of data units are included in a data cluster, the decoder scans the plurality of data units according to the at least one U-pattern, scans and decodes the data unit, followed by scanning and decoding a neighboring data unit horizontally or vertically adjacent to the data unit. When an image is divided into a plurality of data clusters including the data cluster, the decoder scans and decodes the plurality of data clusters according to the U-pattern, the data cluster is scanned and decoded, followed by a neighboring data cluster horizontally or vertically adjacent to the data cluster.

Accordingly, in one aspect of the embodiment, data cluster comprising a plurality of data units is scanned by adopting a scan pattern comprising at least one U-pattern. The data cluster is a largest coding unit (LCU), a portion of an LCU, or a coding unit (CU). The data unit is a coding unit (CU) or a prediction unit (PU). Based on split flag, PU mode, and depth value set for a data unit, the data unit is recursively scanned by adopting the U-pattern. The U-pattern is either upright U-pattern or rotated U-pattern.

In another aspect of the embodiment, an image is divided to form at least one U-scan block. The U-scan block comprises a plurality of largest coding units (LCUs). The U-scan block is scanned by adopting a scan pattern comprising at least one U-pattern. The U-pattern is either upright U-pattern or rotated U-pattern.

The advantages of the present disclosure include, but are not limited to, scanning of data clusters such as LCUs and scanning of data units within the LCUs such as CUs and PUs, using the U-pattern. Such scanning using the U-pattern enables large number of neighbors for prediction by virtue of design of the U-pattern, thereby increasing number of predictors for prediction encoding and resulting in better coding efficiency. This further enables larger re-usage of already cached search region area.

Further, grouping of the LCUs within the sub U-scan blocks and scanning the LCUs within the sub U-scan block enables better coding of image data having higher resolution and improves coding efficiency.

These aspects and advantages will be more clearly understood from the following detailed description taken in conjunction with the accompanying drawings.

BRIEF DESCRIPTION OF DRAWINGS

To further clarify advantages and aspects of the present disclosure, a more particular description of the present disclosure will be rendered by reference to specific embodiments thereof, which is illustrated in the appended drawings. It is appreciated that these drawings depict only typical embodiments of the present disclosure and are therefore not to be considered limiting of its scope. The present disclosure will be described and explained with additional specificity and detail with the accompanying drawings, which are listed below for quick reference.

Figure 3C:
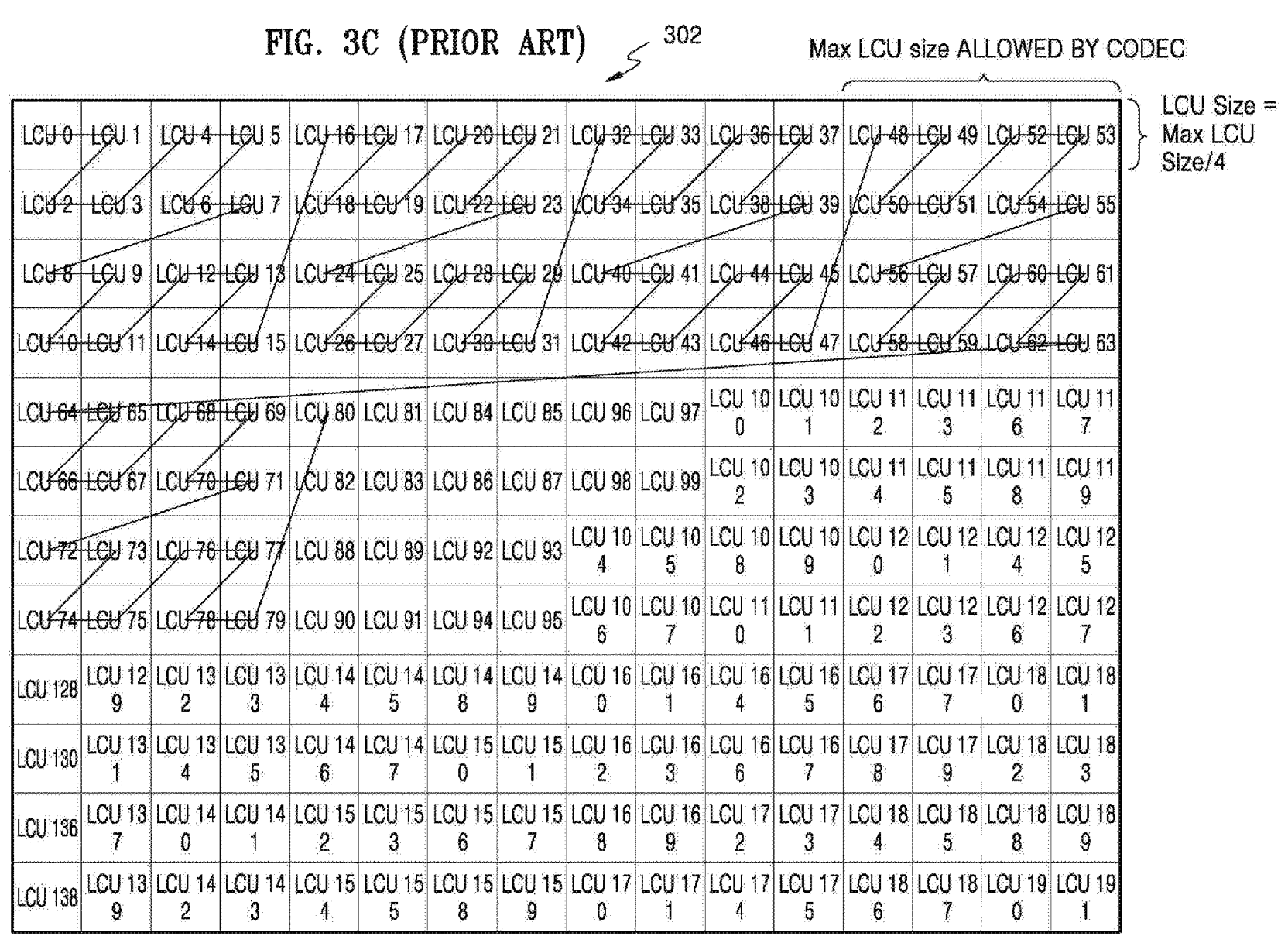

FIGS. 2, 3A, 3B, 3C, 4A, and 4B schematically illustrate a Z-scan pattern for scanning a frame, in accordance with other solutions as known in the art;

FIGS. 19, 20, 21, 22, 23A, 23B, 23C, 24A, 24B, 24C, 25A and 25B illustrate examples of scanning of hierarchically split CUs for using a U-pattern, in accordance with the embodiment of the present disclosure;

Figure 1A:
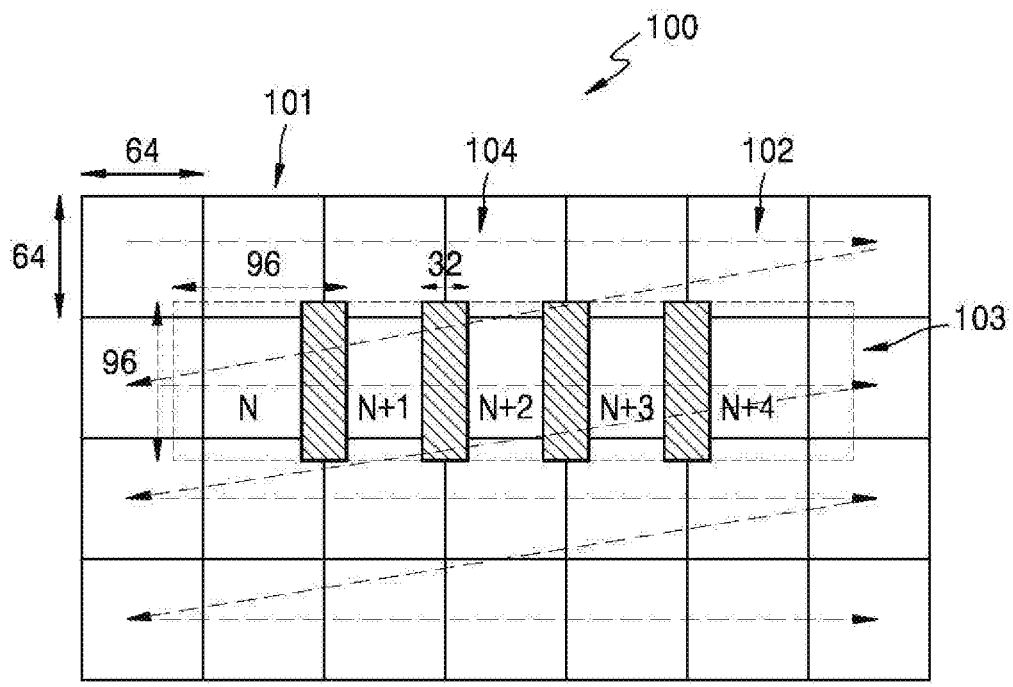
FIGS. 1A and 1B schematically illustrate a raster scan pattern for scanning a frame, in accordance with a solution, as known in the art.
Figure 1B:
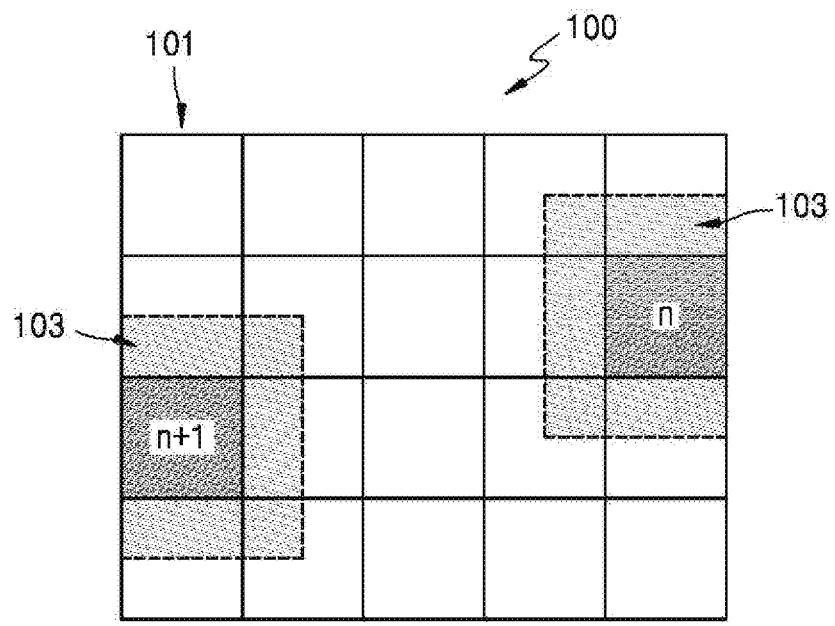

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the present disclosure. Furthermore, the one or more elements may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the present disclosure.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having an ordinary skill in the art.

Reference is made herein to some "embodiments." It should be understood that an example embodiment is an example of a possible implementation of any features and/or elements presented in the description. Some embodiments have been described for the purpose of illuminating one or more of the potential ways in which the specific features and/or elements of the descriptions fulfill the requirements of uniqueness, utility and non-obviousness.

Use of the phrases and/or terms such as but not limited to "a first embodiment," "a further embodiment," "an alternate embodiment," "one embodiment," "an example embodiment," "multiple embodiments," "some embodiments," "other embodiments," "further embodiment", "furthermore embodiment", "additional embodiment" or variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Example embodiments will now be described more fully with reference to the accompanying drawings, in which the example embodiments are shown. Further, the example embodiments are described using terminologies defined and referred to in the latest video coding standards, such as high efficiency video coding (HEVC). For example, blocks of a predetermined size in the HEVC standard are referred to as Largest Coding Units (LCUs). As would be understood, the terminologies may be different in other video coding standards. For example, an LCU in the HEVC standard is equivalent to a macroblock in the MPEG standard.

Figure 6:
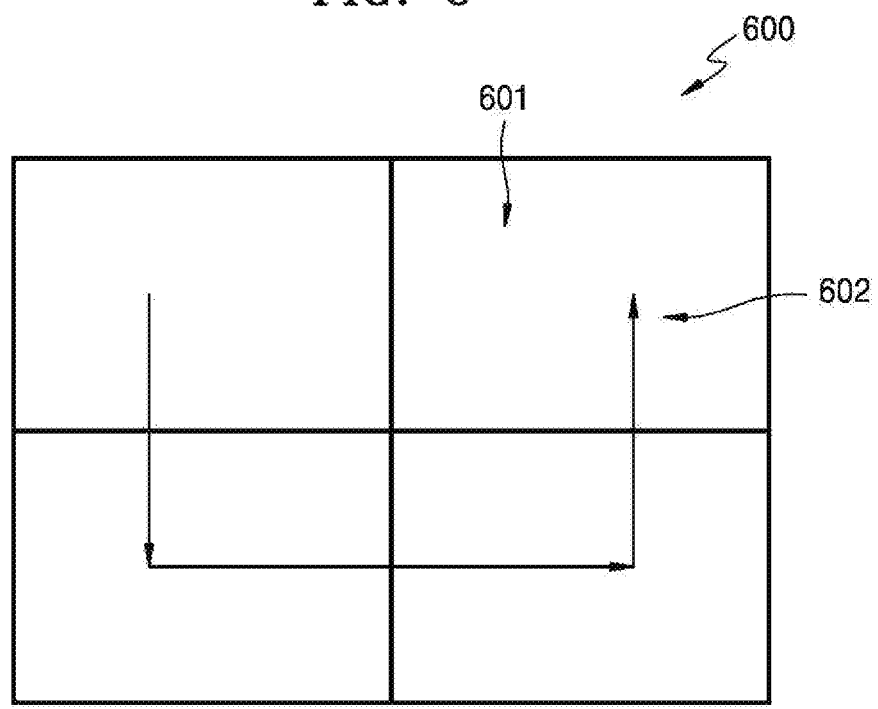
FIG. 6 illustrates scanning CUs in an LCU using a U-pattern, in accordance with one aspect of an example embodiment of the present disclosure.

The present disclosure is related to scanning CUs inside an LCU by using or adopting a U-pattern that enables higher overlap between search regions of nearby CUs, thereby providing higher memory bandwidth savings, and improving coding efficiency. The U-pattern may be an upright U-pattern (e.g., upright or vertical with respect to an orientation of the image) or a rotated U-pattern. The scanning of the CUs based on the U-pattern may be performed starting from a top-left CU. Accordingly, FIG. 6 illustrates an example of scanning CUs in an LCU 600 using a U-pattern, in accordance with one aspect of an example embodiment of the present disclosure. The LCU 600 is divided into a plurality of CUs 601. For the sake of brevity, only four (4) CUs are illustrated. By adopting the upright U-pattern 602, the scanning of the CUs begins from a top-left corner (e.g., a top-left CU) and proceeds with: scanning "n" number of CUs in a vertical downward direction; scanning "m" number of CUs in a horizontal rightward direction; and scanning "n" number of CUs in a vertical upward direction (as illustrated by the directional arrows). The value of "n" is equal to 0 or 1; "m" is equal to 0 or 1; and "m" and "n" are not simultaneously 0. In FIG. 6, m=1; and n=1, for the sake of brevity and convenience.

Figure 7:
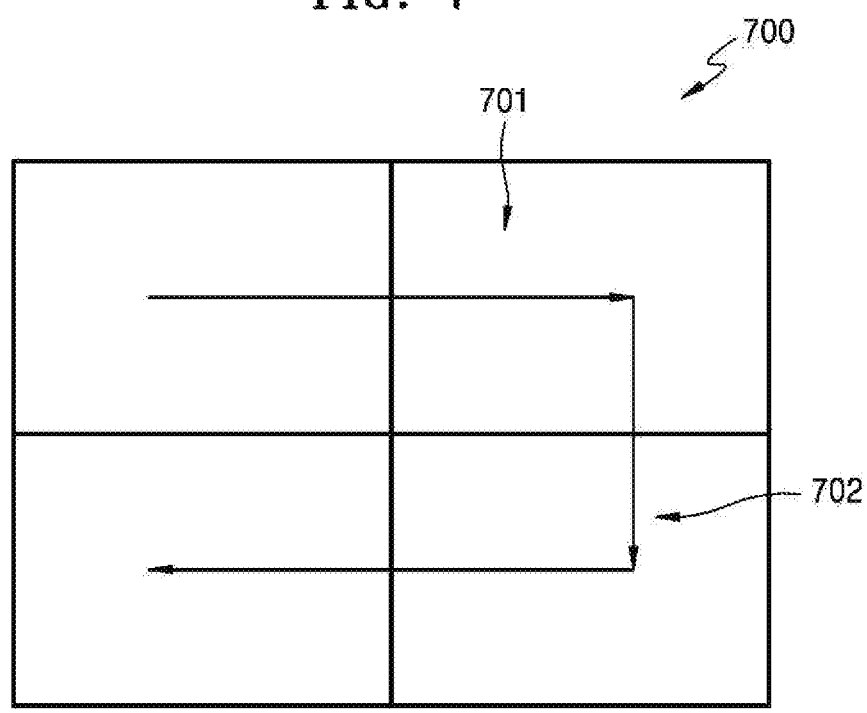
FIG. 7 illustrates scanning CUs in an LCU using a U-pattern, in accordance with another aspect of the embodiment of the present disclosure.

Similarly, FIG. 7 illustrates scanning CUs in an LCU 700 using a U-pattern, in accordance with another aspect of the embodiment of the present solution. The LCU 700 is divided into a plurality of CUs 701. For the sake of brevity, only four (4) CUs are illustrated. By adopting the rotated U-pattern 702, the scanning of the CUs begins from a top-left corner (e.g., top-left CU) and proceeds with: scanning "a" number of CUs in a horizontal rightward direction; scanning "b" number of CUs in a vertical downward direction; and scanning "a" number of CUs in a horizontal leftward direction (as illustrated by the directional arrows). The value of "a" is equal to 0 or 1; "b" is equal to 0 or 1; and "m" and "n" are not simultaneously 0. In FIG. 7, m=1 and n=1 for the sake of brevity and convenience.

The scanning of the CUs by adopting a U-pattern increases overlap between search windows of surrounding or neighboring CUs and addresses the row-switching penalty with respect to memory bandwidth. In a group of four (4) CUs arranged in a 2×2 array, when consecutively scanning the four (4) CUs according to a U-pattern of the example embodiments above, for example, the search window overlap for the first CU (e.g., top-left CU) and the third CU (e.g., bottom-right CU) is the same as the search window overlap for the first Cu and the third CU when using a raster scan. However, a higher search window overlap is achieved while scanning the second CU (e.g., top-right CU) and the fourth CU (e.g., bottom-left CU) since the second CU and the fourth CU have search window overlap with previously scanned CUs that are adjacent (or to the left) to them.

Accordingly, FIGS. 8A, 8B, 8C and 8D illustrate an exemplary search region overlap 800 between search windows (represented by dashed square) of spatially adjacent CUs 801, while using upright U-pattern 802, in accordance with the embodiment of the present disclosure. For sake of brevity, only four (4) consecutive and spatially adjacent CUs are being illustrated. In addition, for the sake of understanding, each CU of the examples in FIGS. 8A, 8B, 8C and 8D has a size of (64×64) 4096 pixels, and the search region of each CU is +/−16 pixels in both X and Y directions. As such, the search region includes ((64+32=96)×(64+32=96)) 9216 pixels.

Figure 4A:
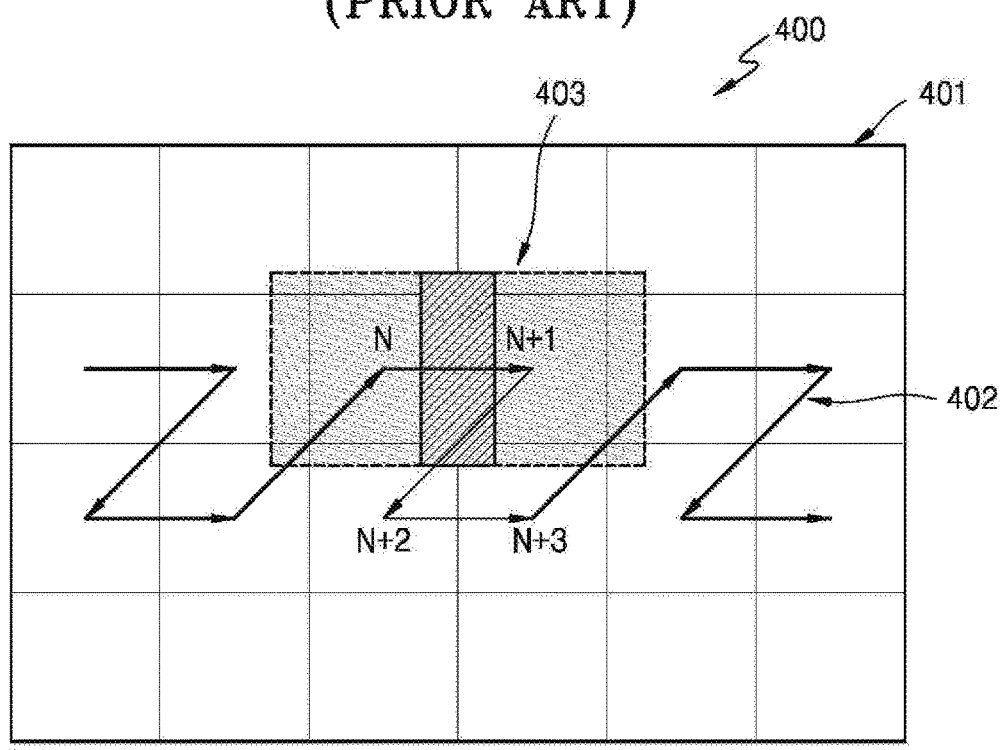
Figure 4B:
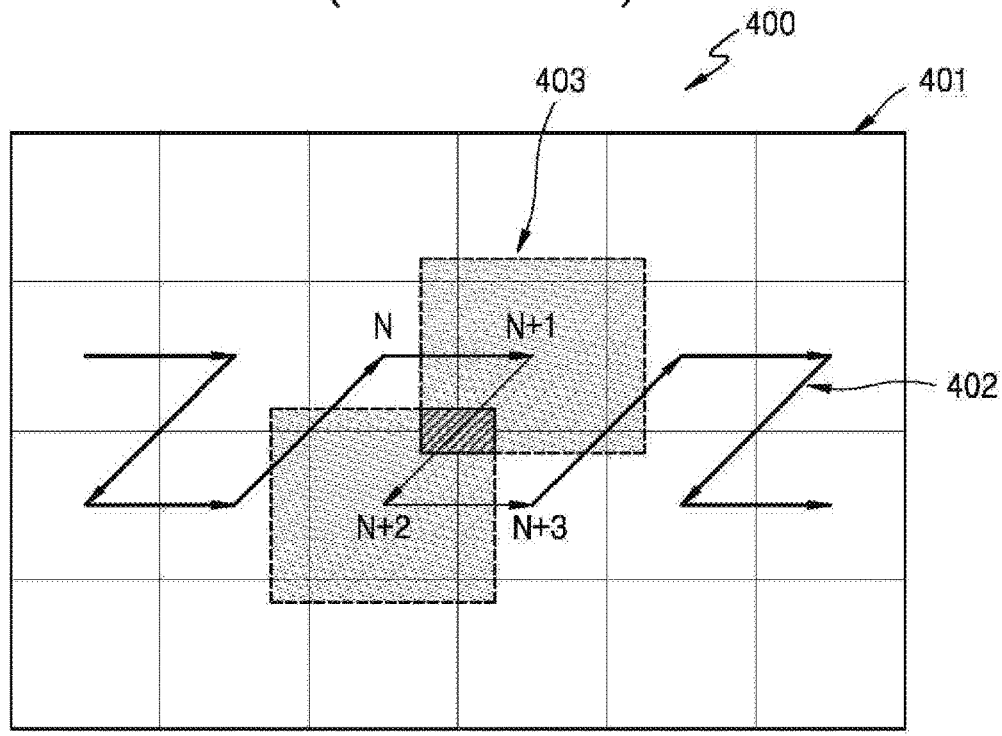
Figure 5A:
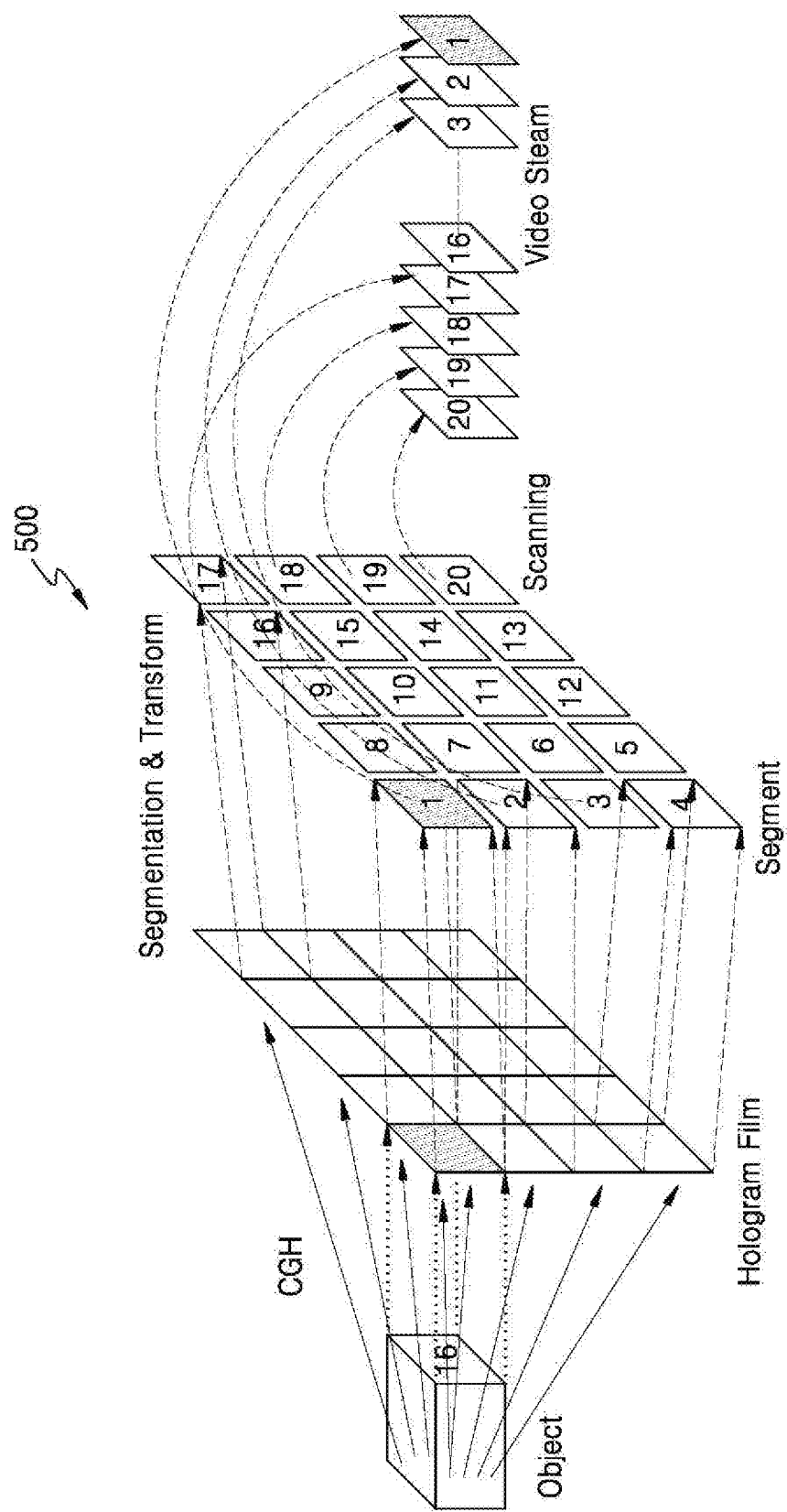
FIGS. 5A and 5B schematically illustrate a scan pattern for scanning a frame of a digital hologram, in accordance with one other solution as known in the art.
Figure 5B:
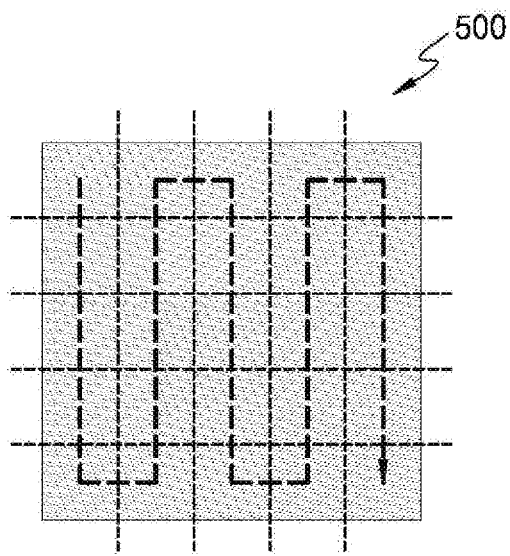
Figure 8A:
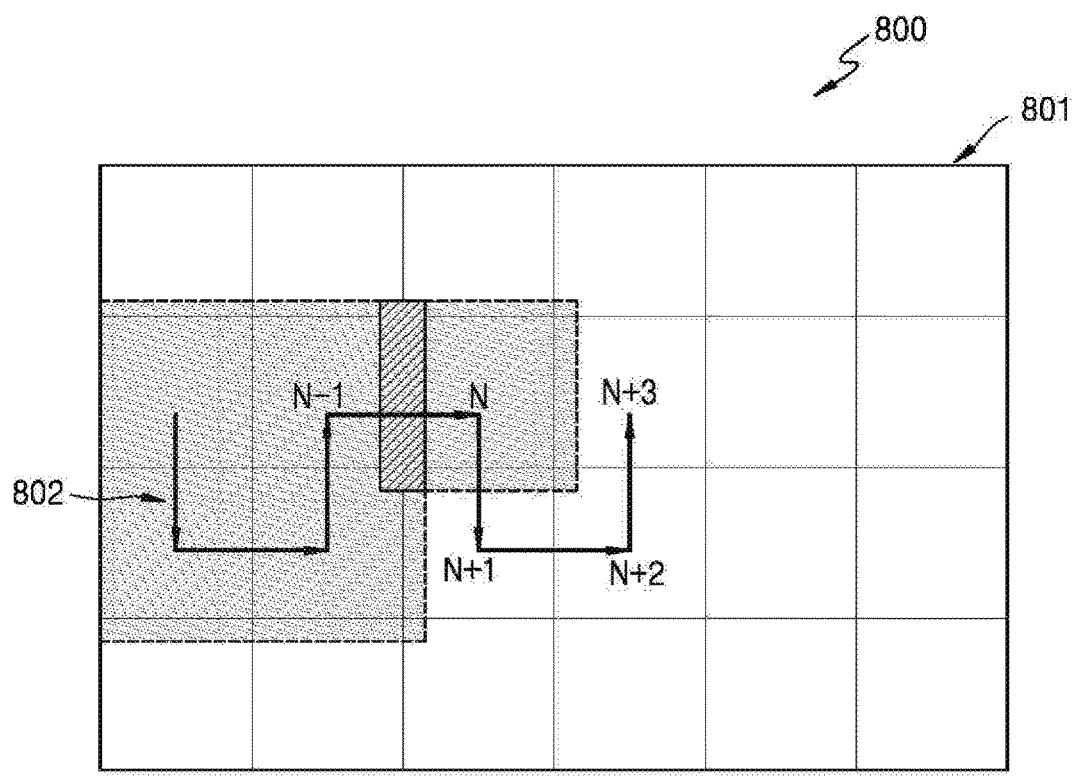
FIGS. 8A, 8B, 8C, and 8D illustrate search region overlap for different CUs while using a U-pattern, in accordance with the embodiment of the present disclosure.
Figure 8B:
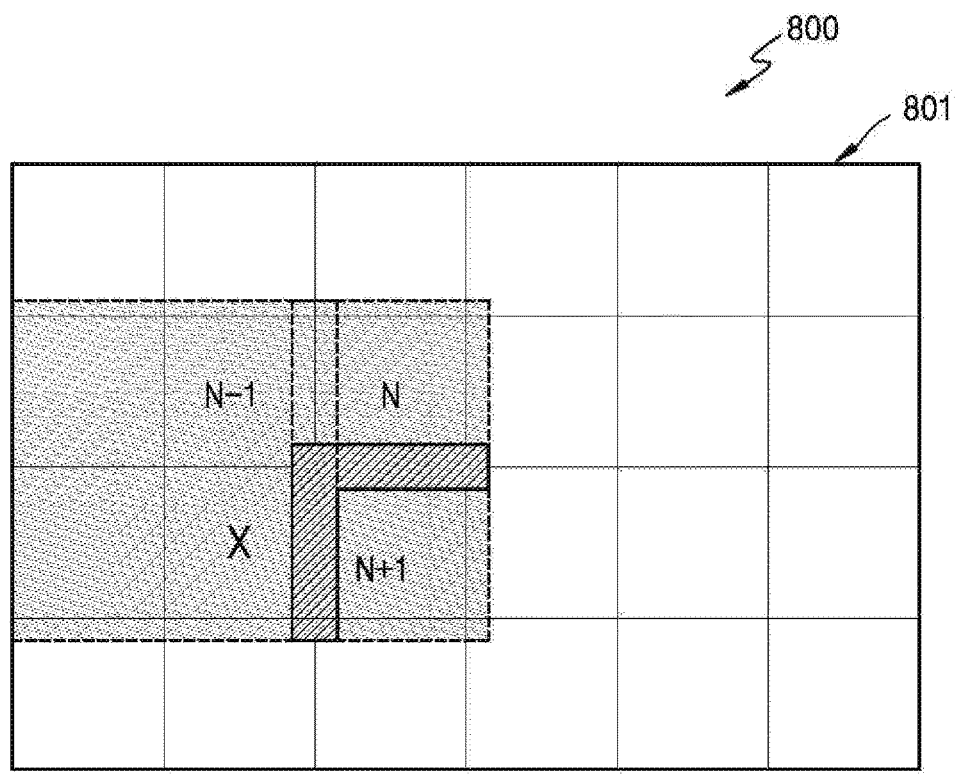
Figure 8C:
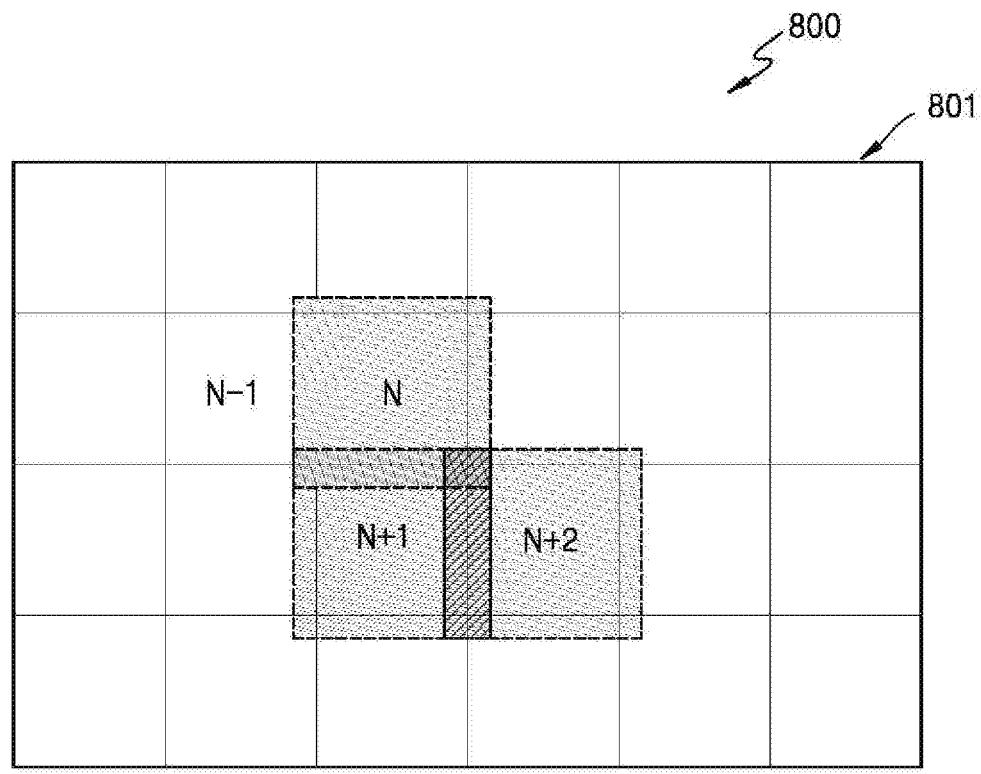
Figure 8D:
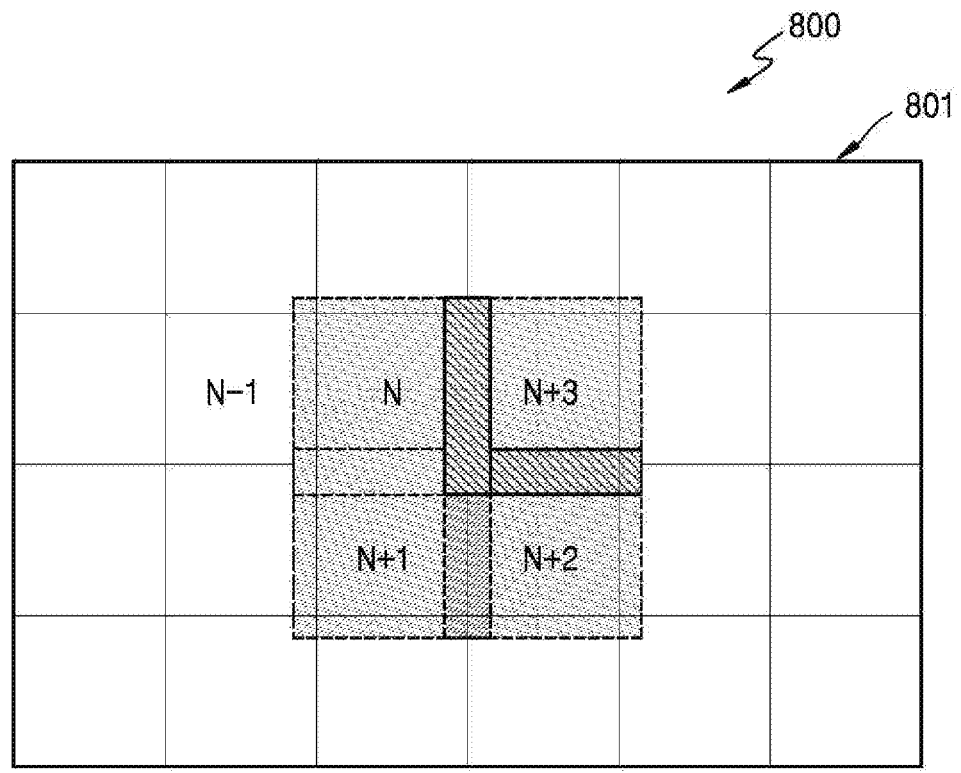

Referring to FIG. 8A, the search window overlap between search regions of CU N−1 and CU N is similar to the search window overlap when using a raster scan while scanning CU N, which is adjacent (or to the left of) to the CU N−1. Thus, the search window overlap is (32×96) 3072 pixels, as illustrated in FIGS. 1A and 4A. Referring to FIG. 8B, while scanning CU N+1, the search window overlap includes search window overlap between search regions of CU N and CU N+1 and search window overlap between search regions of CU N+1 and a CU scanned prior to CU N+1 (denoted by X). Thus, for CU N+1, the search widow overlap is (32×96) 3072 pixels and the additional search region overlap is (32×64) 2048 pixels, thereby resulting in a total overlap of 5120 pixels. Referring to FIG. 8C, while scanning CU N+2, the search window overlap is between search regions of CU N+1 and CU N+2. The search window overlap for CU N is again similar to the search window overlap when using a raster scan and search window overlap, and is 3072 pixels. Referring to FIG. 8D, while scanning CU N+3, the search window overlap includes search window overlap between search regions CU N and CU N+3 and search window overlap between search regions CU N+3 and CU N+2, similar to search window overlap for CU N+1.

Thus, according to the above example embodiment, there is an additional overlap of (9216−5120) 4096 pixels for the four CUs, which is 33.33% more than the overlap of 3072 pixels in raster scan. As such, a 33.33% increase in bandwidth savings is provided for fetching reference frame data compared to traditionally used raster scanning. Moreover, this gain in terms of memory bandwidth is proportional to the size of the search window. In other words, the gain in terms of memory bandwidth further improves for larger search windows. For example—for fast motion video sequences such as sports sequences, the search regions are generally larger by up to +/−64 pixels in each direction and therefore, the search region may include ((64+128=192)× (64+128=192))=36864 pixels. Consequently, referring to FIGS. 8A, 8B, 8C and 8D, the search window overlap for CU N+1 and CU N+3 increases considerably, thereby providing improved memory bandwidth savings.

Further, in accordance with the latest video coding standards such as HEVC, the LCUs are split recursively in a hierarchical structure or quad-tree structure (hereinafter referred to interchangeably) into CUs for scanning or encoding a current frame. As such, a maximum size and a depth define the CU. The depth denotes the number of times the CU is spatially split from the LCU (e.g., the number of splits recursively applied to the LCU), and as the depth increases, deeper CUs (e.g., CUs having a lower depth than a current CU) according to depths may be split from the LCU to a minimum CU (i.e., a CU at the lowermost depth of the LCU) which is no longer split. The depth of the LCU is an uppermost depth and the depth of the minimum CU is the lowermost depth. Since the size of a CU decreases as the depth of the LCU increases, a CU of an upper depth may include a plurality of CUs of lower depths. For example, a CU having a maximum size of 32×32 and a depth of 2 may be split first into four 16×16 CUs, and then one or more of the 16×16 CUs may further be split into four 8×8 CUs. The U-pattern may accordingly be applied recursively to all the deeper CUs inside the CU (e.g., on all of the 8×8 CUs of the 16×16 CU).

Further, prediction encoding may be performed on a minimum CU, that is, a CU that cannot be split further. Such a minimum CU may be incorporated as a basis unit for prediction encoding and referred to as a 'prediction unit (PU)'. A PU obtained from a CU may include a data unit whose size is identical to the size of the CU, and partitions obtained by splitting at least one of a height and a width of the CU. A prediction mode applied to the PU may be at least one of an intra mode, a inter mode, and a skip mode. Encoding may independently be performed on a PU in a CU, thereby selecting a prediction mode having a smallest encoding error. The U-pattern is accordingly applied recursively on all PUs inside the CU.

Furthermore, frequency transformation may be performed on a 'transformation unit (TU)'. The TU is hierarchically split from the CU. Similar to the CU, the TU in the CU may be recursively split into smaller sized TUs, and thus, residual data in the CU may be divided according to the TU having a tree structure according to transformation depths. The transformation depth indicates the number of times splitting is performed to reach the TU. Splitting the CU to reach the TU may include splitting the height and width of the CU. The transformation depth for the TU may also be set. The TU may be scanned using a pattern known in the art, for example, a zigzag pattern, but scanning of the TU is not limited thereto.

Accordingly, FIGS. 9, 10, 11, 12, 13, 14 and 15 illustrate a relationship between hierarchically split CUs, i.e., CU, PU, and TU, in accordance with an example embodiment of the present disclosure. The reference numerals in these figures are even numbers starting from x10 ('x' being the figure number) for ease of reference between similar CUs, PUs, and TUs and ease of understanding.

Figure 9:
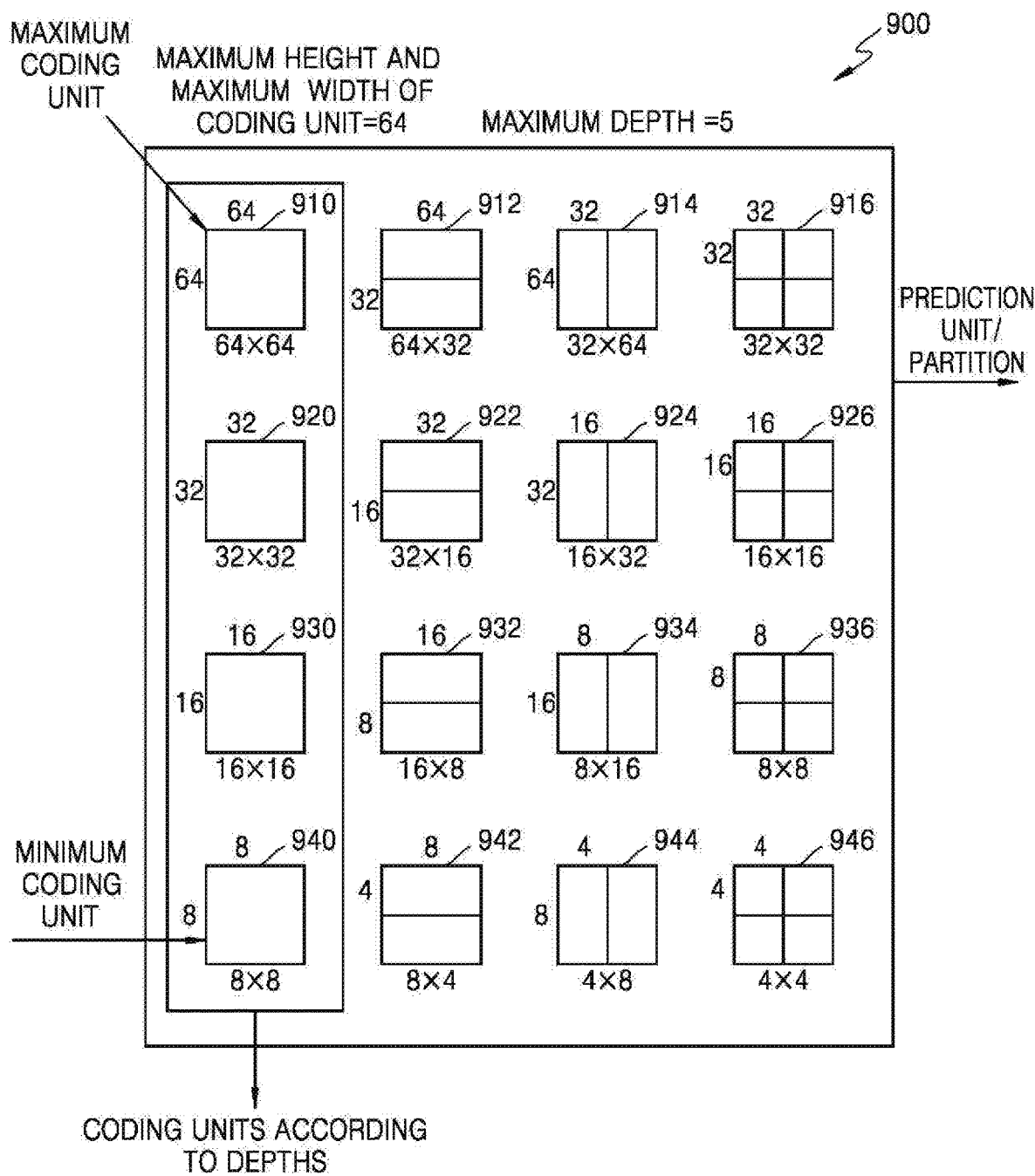
FIG. 9 illustrates an example hierarchical structure of deeper CUs obtained by hierarchically splitting a CU for scanning using a U-pattern, in accordance with the embodiment of the present disclosure.

FIG. 9 illustrates an example hierarchical structure 900 of deeper CUs obtained by hierarchically splitting a CU, in accordance with an example embodiment of the present disclosure. The CU is hierarchically split based on characteristics of an image. As such, a maximum height, a maximum width, and a maximum depth of CUs may be adaptively determined according to the characteristics of the image, or may be previously set by a user. In addition, sizes of deeper CUs according to depths may be determined according to the maximum size of the CU, which is previously set.

Referring to the FIG. 9, in the example hierarchical structure 900 of a CU, the maximum height and the maximum width of the CU is set as 64, and the maximum depth is set as four (4). The deeper CUs obtained by splitting the CU according to depth are shown along the vertical axis of the hierarchical structure 900 of the CU. Thus, a CU 910 is a maximum CU (or interchangeably referred to as a largest coding unit LCU) in the hierarchical structure 900 of the CU, wherein the depth thereof is 1 and the size, i.e., height by width, is 64×64. The maximum CU is hierarchically split into deeper CUs until the maximum depth of 4 is reached, as shown along the vertical axis of the hierarchical structure 900. The smallest size allowed for a CU (e.g., the allowed size for a minimum CU) is 8×8. As such, a CU 920 having a size of 32×32 and a depth of 2, a CU 930 having a size of 16×16 and a depth of 3, a CU 940 having a size of 8×8 and a depth of 4 are obtained.

Further, a prediction unit and partitions, which are bases for prediction encoding of each of the deeper CUs 920 to 940, are shown along a horizontal axis of the hierarchical structure 900 of the CUs. As described earlier, a CU that cannot be split further becomes a basis unit for prediction encoding and is referred to as a 'prediction unit (PU)'. A PU obtained from the CU may include a data unit whose size is identical to the size of the CU, and partitions obtained by splitting at least one of a height and a width of the CU. Examples of a partition type include a partition whose size is identical to the size of the CU, symmetrical partitions that are obtained by symmetrically splitting a height or width of the CU, partitions obtained by asymmetrically splitting the height or width of the CU, such as 1:n or n:1, partitions that are obtained by geometrically splitting the CU, and partitions having arbitrary shapes.

Thus, for a CU 910 having a size of 64×64 and a depth of 1, the CU 910 may be split into partitions as the PU, e.g., a partition 910 having a size of 64×64, a partition 912 having a size of 64×32, partition 914 having a size of 32×64, or a partition 916 having a size of 32×32.

Similarly, for a CU 920 having a size of 32×32 and a depth of 2, the CU 920 may be split into partitions as the PU, e.g., a partition 920 having a size of 32×32, a partition 922 having a size of 32×16, a partition 924 having a size of 16×32, and a partition 926 having a size of 16×16.

Similarly, for a CU 930 having a size of 16×16 and a depth of 3, the CU 930 may be split into partitions as the PU, e.g., a partition having a size of 16×16 included in the CU 930, a partition 932 having a size of 16×8, a partition 934 having a size of 8×16, and a partition 936 having a size of 8×8.

Similarly, for a CU 940 having a size of 8×8 and a depth of 4, the CU 940 may be split into partitions as the PU, e.g., a partition having a size of 8×8 included in the CU 940, a partition 942 having a size of 8×4, a partition 944 having a size of 4×8, and a partition 946 having a size of 4×4.

Further, to perform encoding according to each depth, a representative encoding error in the corresponding depth may be selected. For each depth, the smallest encoding error may be selected as the representative encoding error. The smallest encoding error may be determined by performing encoding for each CU corresponding to each depth included in the maximum CU 910 and for each PU in the deeper CUs in the maximum CU 910. A depth and a partition at which the encoding error in the maximum CU 910 is smallest may be selected as a coded depth (i.e., depth having the smallest encoding error) and a partition type of the maximum CU 910. Further, split information may be used to indicate a change in depth. The split information may indicate whether a CU of a current depth is split into CUs of a lower depth.

Figure 10:
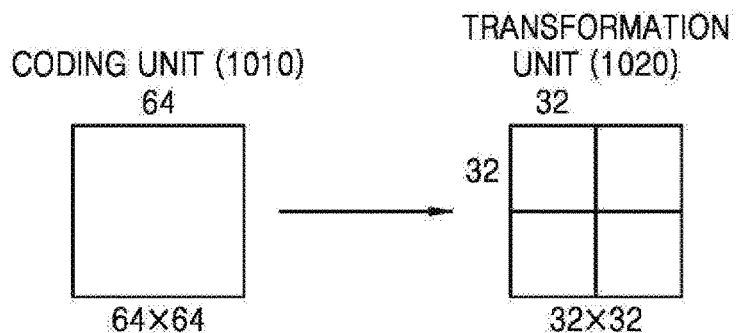
FIGS. 10, 11, 12, 13, 14, 15 and 16 illustrate an example relationship between hierarchically split CUs for scanning using a U-pattern, in accordance with the embodiment of the present disclosure.

FIG. 10 illustrates an example relationship 1000 between hierarchically split CUs, i.e., the CU and TU, in accordance with an example embodiment of the present disclosure. As described earlier, for a CU currently being scanned, TU sizes for frequency transformation during encoding may be selected based on data units that are not larger than the CU.

Referring to FIG. 10, a current CU 1010 has a size of 64×64. Data of the CU 1010 may be encoded by performing a frequency transformation on a TU having the smallest encoding error. Accordingly, the CU 1010 64×64 is split into TUs having sizes of 32×32, 16×16, 8×8, and 4×4. In FIG. 10, frequency transformation may be performed by using a TU 1020 having a size of 32×32, assuming TU 1020 has the smallest encoding error. As described earlier, the TU may be scanned using a pattern known in the art, for example, a zigzag pattern, but scanning of the TU is not limited thereto.

Figure 11:
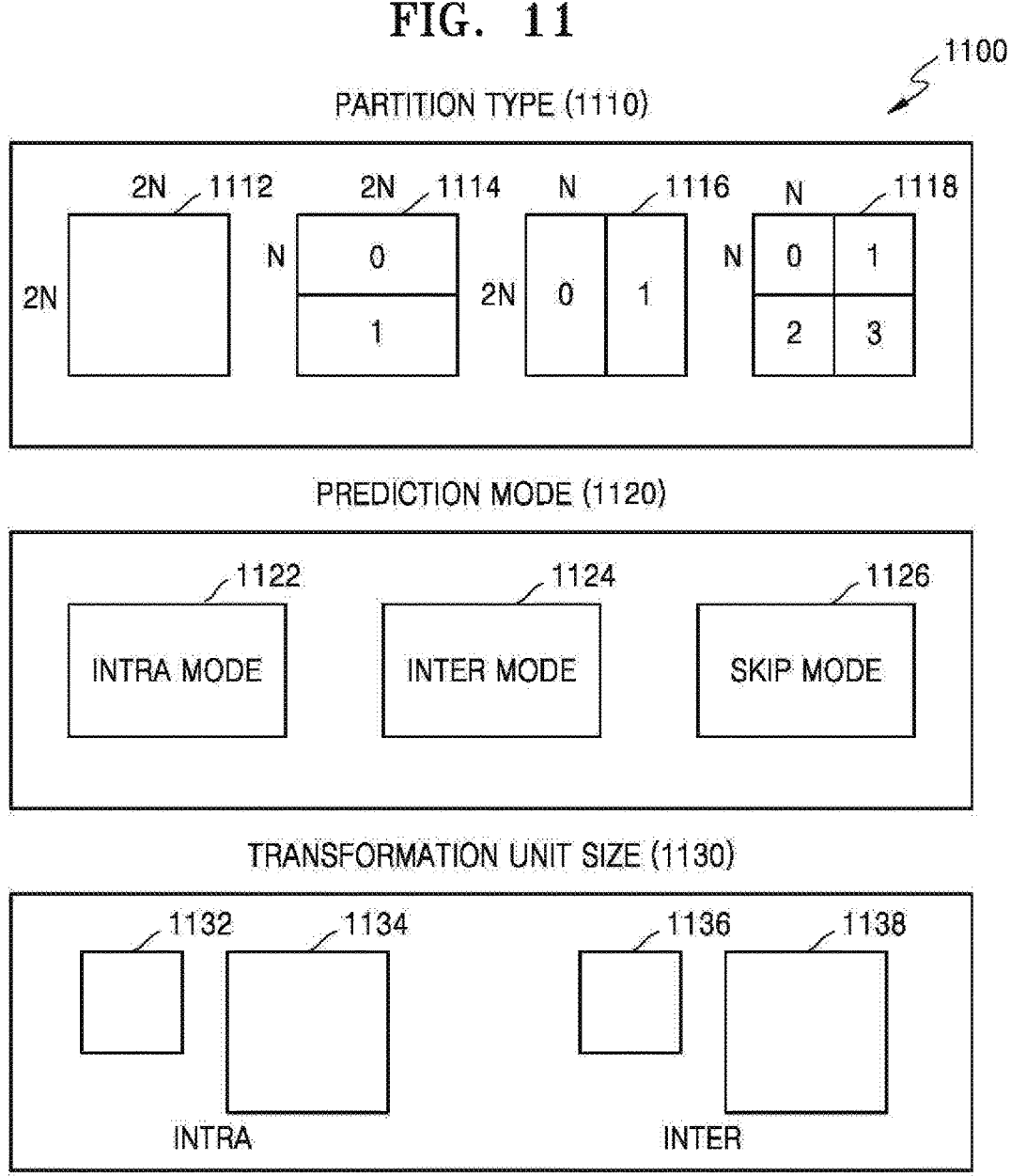
Figure 12:
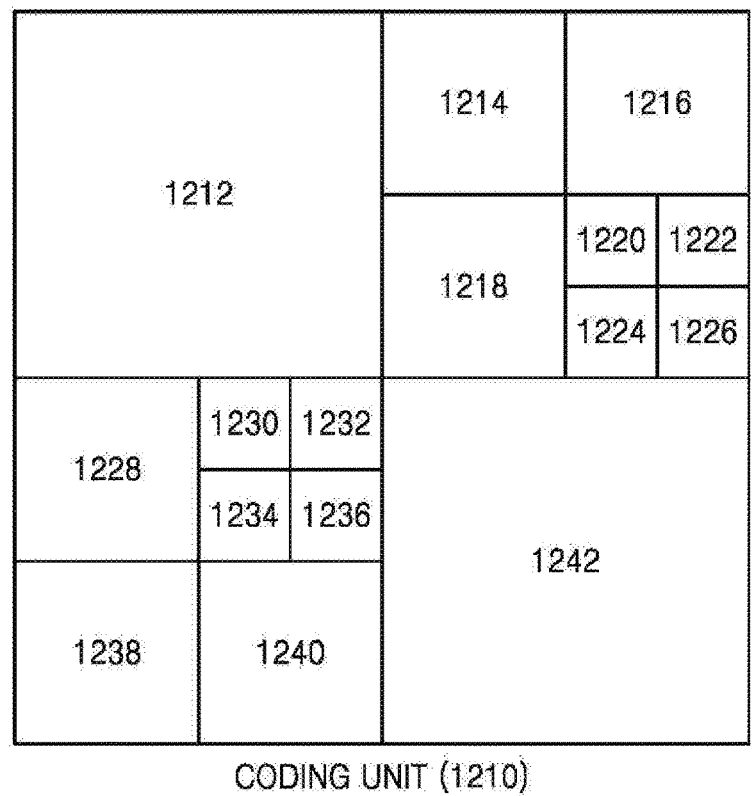
Figure 13:
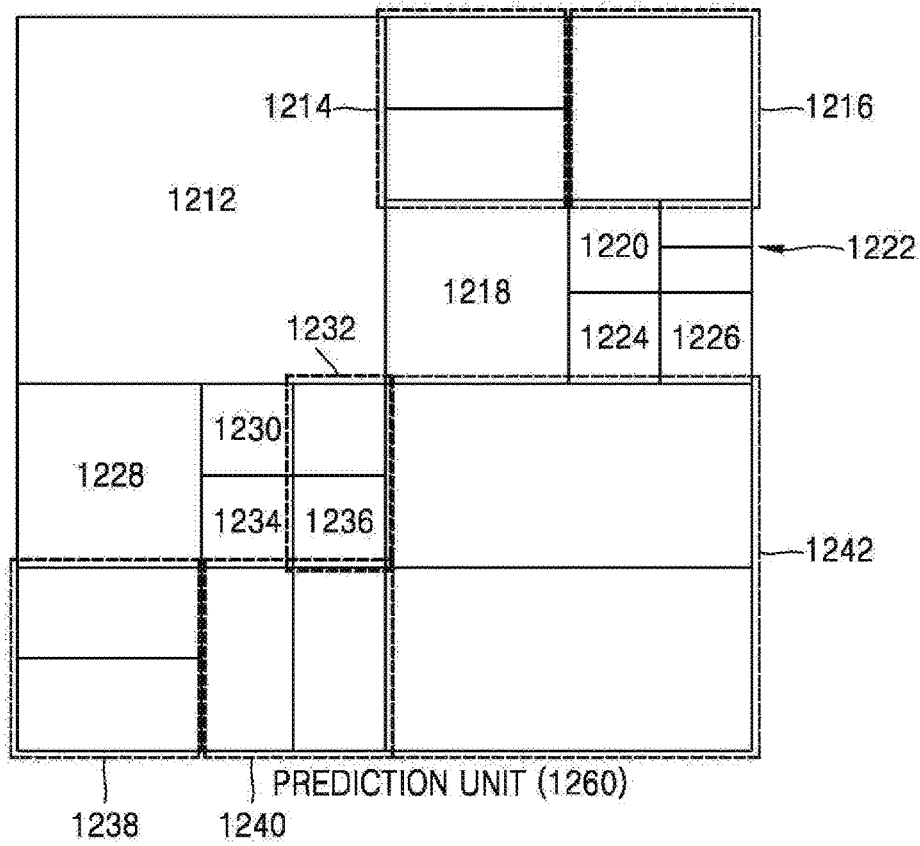
Figure 14:
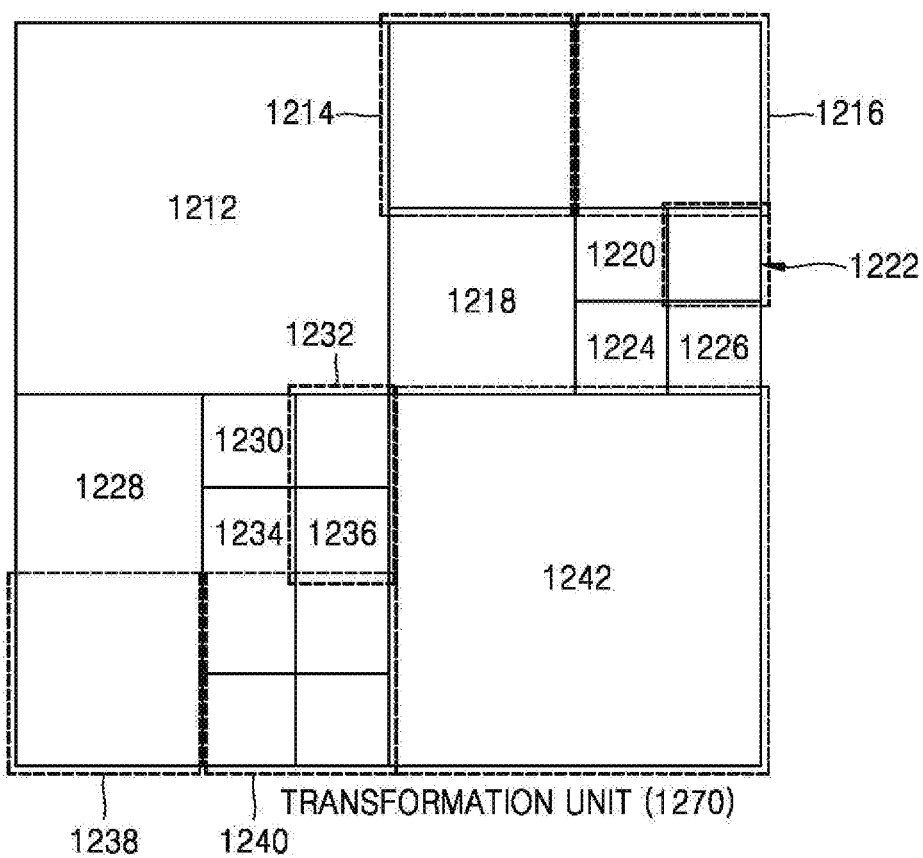

FIG. 11 illustrates an example relationship 1100 between hierarchically split CUs, i.e., the CU and PU, in accordance with an example embodiment of the present disclosure. As described earlier, encoding may be recursively performed on each of CUs included in a hierarchical structure in a maximum CU to determine an optimum CU having the smallest encoding error. Thus, information transmitted to video decoders about an encoding mode may include the coded depth of the CU (i.e., depth having the smallest encoding error), information about a partition type 1110, information about a prediction mode 1120, and information about a size of a transformation unit 1130 for each CU corresponding to the coded depth.

The information about the partition type 1110 indicates information about a shape of a partition (PU) obtained by splitting a current CU, wherein the partition is a data unit for prediction encoding of the current CU. For example, a current CU (CU-0) having a size of 2N×2N may be split according to any one of a partition 1112 having a size of 2N×2N, a partition 1114 having a size of 2N×N, a partition 1116 having a size of N×2N, and a partition 1118 having a size of N×N. As such, the information about the partition type 1110 of the current CU may indicate whether the current CU is split according to the partition 1114 having a size of 2N×N, the partition 1116 having a size of N×2N, or the partition 1118 having a size of N×N.

Further, the information about the prediction mode 1120 indicates a prediction mode of each partition. For example, the information about the prediction mode 1120 may indicate a mode of prediction encoding performed on a partition as indicated by the partition type 1110, i.e., an intra mode 1122, an inter mode 1124, and a skip mode 1126.

Furthermore, the information about the size of the TU 1130 indicates a TU on which frequency transformation is to be based when frequency transformation is performed on a current CU. For example, the TU may be a first intra TU 1132, a second intra TU 1134, a first inter TU 1136, and a second intra TU 1138.

Thus, by performing the encoding repeatedly, a video encoder may select a coded depth (i.e., depth having a smallest encoding error) by comparing encoding errors according to depths of the CU, and may set a corresponding partition type and a prediction mode as an encoding mode of the coded depth. As such, the smallest encoding errors according to depths are compared in all of the depths ranging from a depth 0 to a depth 'd', and a coded depth (i.e., a depth having the smallest encoding error) may be determined. The coded depth, the partition type of the prediction unit, and the prediction mode may be encoded and transmitted as information about an encoding mode. In addition, a CU has to be split from a depth of zero (0) to the coded depth. Therefore, split information of a CU having the coded depth is set to zero (0) and split information of CUs having a depth smaller than the coded depth is set to one (1). The encoder may then transmit the split information, the information about a partition type, the information about a prediction mode, and the information about a size of a transformation unit, to a video decoder.

Thereafter, the video decoder may extract and use the information about the split information, the information about a partition type, the information about a prediction mode, and the information about a size of a transformation unit to decode CUs. The decoder may set, as a coded depth, a depth in which split information is zero (0), by using split information according to depths, and may use information about an encoding mode of the coded depth for decoding.

Accordingly, FIGS. 12, 13, 14 and 15 illustrate an example relationship between hierarchically split CUs, PUs, and TUs in accordance with an example embodiment of the present disclosure. The reference numerals in these figures are even numbers starting from x10 ('x' being the figure number) for ease of reference between similar CUs, PUs, and TUs and ease of understanding. In the example, the minimum size of the CU is set as 8×8 and depth is set as 4.

The CUs 1210 are CUs corresponding to coded depths in a maximum CU (not shown in the figures). The PUs 1260 are partitions of PUs of each of the CUs 1210, and the TUs 1270 are TUs of each of the CUs 1210. For ease of reference, in FIG. 12, only one CU 1210 is illustrated.

Assuming, for example, a depth of a maximum CU 1210 is 1, then depths of CUs 1212 and 1242 are 2, depths of CUs 1214, 1216, 1218, 1228, 1238, and 1240 are 3, and depths of CUs 1220, 1222, 1224, 1226, 1230, 1232, 1234, and 1236 are 4.

In the PUs 1260, some partitions 1214, 1216, 1222, 1232, 1236, 1238, 1240, and 1242 are obtained by splitting the CUs 1210 through 1236. In other words, partition types in the partitions 1214, 1222, 1238, and 1242 have a size of 2N×N. Partition types in the partitions 1216, 1236, and 1240 have a size of N×2N. The partition type of the partition 1232 has a size of N×N. PUs and partitions of the CUs 1210 are smaller than or equal to each CU in which the Pus or partitions are included. For ease of reference, in FIG. 13, only one PU 1260 is illustrated.

Frequency transformation or inverse frequency transformation may be performed on image data of the TU 1242 in the TUs 1270 in a data unit that is smaller than the TU 1242. Also, the TUs 1214, 1216, 1222, 1232, 1236, 1238, and 1240 in the TUs 1270 are different from those in the PUs 1260 in terms having sizes of or shapes. In other words, a video encoder and a video decoder may perform intra prediction/motion estimation/motion compensation and frequency transformation/inverse frequency transformation individually per data unit, even in the same CU.

Accordingly, encoding may be recursively performed on each of CUs having a hierarchical structure in each region of a maximum CU to determine an optimum CU (e.g., a CU having an optimal size and the smallest encoding error), and thus CUs having a recursive tree structure may be obtained. Encoding information may include split information about a CU, information about a partition type, information about a prediction mode, and information about a size of a TU.

Table 1 below shows the encoding information that may be set by the video decoder and the video decoder.

TABLE 1

| Split Information 0 (Encoding on CU having Size of 2Nx2N and Current Depth of d) | | | | | Split Information 1 Repeatedly Encode |
|---|---|---|---|---|---|
| Prediction Mode | Partition Type | | Size of TU | | CUs having Lower Depth of d + 1 |
| Intra Inter Skip (Only 2Nx2N) | Symmetrical Partition Type 2Nx2N 2NxN Nx2N NxN | Asymmetrical Partition Type 2NxnU 2NxnD nLx2N nRx2N | Split Information 0 of TU 2Nx2N | Split Information 1 of TU NxN (Symmetrical partition type) N/2xN/2 (Asymmetrical partition type) | |

As described earlier, the video encoder may output the encoding information about the CUs having the tree structure in a bit-stream, and the video decoder may extract the encoding information about the CUs having the tree structure from the received bit-stream. Further, the encoding information may include split information about a CU, information about a partition type, information about a prediction mode, and information about a size of a TU.

Split information indicates whether a current CU is to be split into CUs of a lower depth. As illustrated in Table 1 above and described earlier, if split information of a current depth d is set as 0, the depth d is set as a coded depth, and thus information about a partition type, a prediction mode, and a size of a TU may be defined for the coded depth. On the contrary, if split information of the current depth d is set as 1, the current CU is further split hierarchically into four CUs of a lower depth and encoding is independently performed on the four CUs.

Likewise, a prediction mode may be one of an intra mode, an inter mode, and a skip mode. The intra mode and the inter mode may be applied to all partition types, and the skip mode may be applied only to a partition type having a size of 2N×2N.

Similarly, the information about the partition type may indicate symmetrical partition types having sizes of 2N×2N, 2N×N, N×2N, and N×N, which are obtained by symmetrically splitting a height or a width of a PU, and asymmetrical partition types having sizes of 2N×nU, 2N×nD, nL×2N, and nR×2N, which are obtained by asymmetrically splitting the height or width of the PU. The asymmetrical partition types having the sizes of 2N×nU and 2N×nD are respectively obtained by splitting the height of the PU by 1:3 and 3:1, and the asymmetrical partition types having the sizes of nL×2N and nR×2N are respectively obtained by splitting the width of the PU by 1:3 and 3:1. As described earlier, partition type and partition mode are selected based on the smallest encoding error.

Further, as described earlier, the size of the TU may be set according to two types in the intra mode and two types in the inter mode. As illustrated in Table 1 above and described earlier, if the size of the current CU is 2N×2N, and split information of the TU is set as 0, the size of the TU is set to 2N×2N, i.e., the size of the current CU. On the contrary, if split information of the TU is set as 1, the TUs may be obtained by splitting the current CU. In addition, if a partition type of the current CU having a size of 2N×2N is a symmetrical partition type, a size of a TU may be set to N×N. On the contrary, if the partition type of the current CU is an asymmetrical partition type, the size of the TU may be set to N/2×N/2. As described earlier, TU is selected based on smallest encoding error.

Further, the encoding information about CUs having a tree structure may be assigned to at least one of a CU corresponding to a coded depth, a PU, and a minimum unit. The CU corresponding to the coded depth may include at least one of a PU and a minimum unit containing the same encoding information. Accordingly, a determination of whether adjacent data units are included in the same CU corresponding to the coded depth is made by comparing encoding information of the adjacent data units. In addition, a CU corresponding to a coded depth may be determined by using encoding information of a data unit, and thus a distribution of coded depths in a maximum CU may be determined.

Accordingly, if a current CU is predicted by referring to adjacent data units, encoding information of data units included in deeper CUs adjacent to the current CU may be directly referred to and used.

Alternatively, if a current CU is prediction encoded by referring to adjacent data units, data units adjacent to the current CU and included in deeper CUs may be searched for by using encoded information of the data units, and CUs including the adjacent data units, as found based on the search, may be referred to for prediction encoding the current CU.

Figure 15:
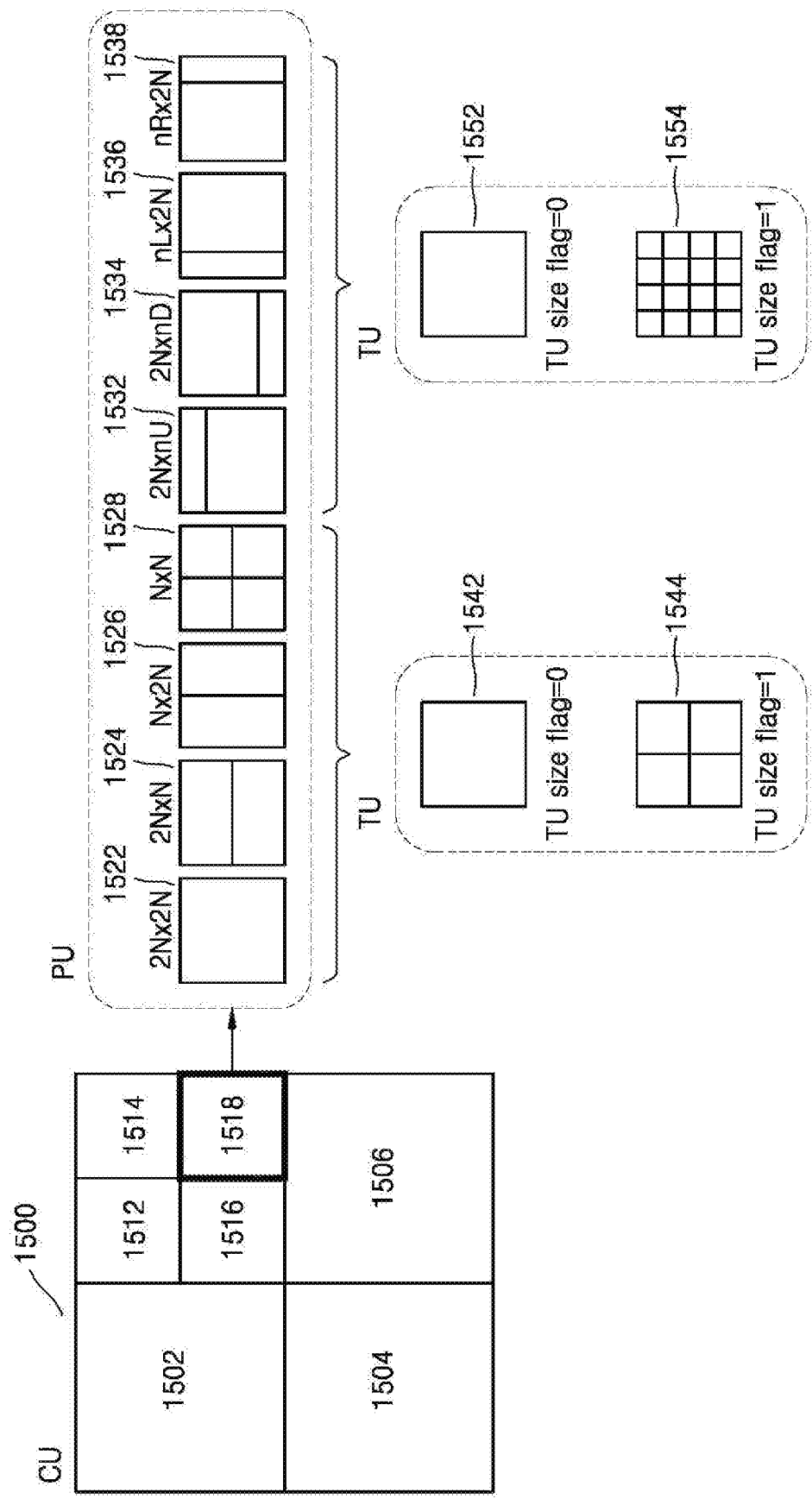

FIG. 15 illustrates an exemplary relationship between a CU, a PU, and a TU, according to the encoding mode information of Table 1, in accordance with the embodiment of the present disclosure. Accordingly, a maximum CU 1500 includes CUs 1502, 1504, 1506, 1512, 1514, 1516, and 1518 of coded depths. The CU 1518 is a CU of a coded depth and therefore split information for CU 1518 is set to 0. Information about a partition type of the CU 1518 having a size of 2N×2N may be set to be one of a partition type 1522 having a size of 2N×2N, a partition type 1524 having a size of 2N×N, a partition type 1526 having a size of N×2N, a partition type 1528 having a size of N×N, a partition type 1532 having a size of 2N×nU, a partition type 1534 having a size of 2N×nD, a partition type 1536 having a size of nL×2N, and a partition type 1538 having a size of nR×2N.

When the partition type is set to be symmetrical, e.g., the partition type 1522 having a size of 2N×2N, 1524 having a size of 2N×N, 1526 having a size of N×2N, or 1528 having a size of N×N, a TU 1542 having a size of 2N×2N may be set if split information (TU size flag) of a TU is 0, and a TU 1544 having a size of N×N may be set if a TU size flag is 1.

When the partition type is set to be asymmetrical, i.e., the partition type 1532 having a size of 2N×nU, 1534 having a size of 2N×nD, 1536 having a size of nL×2N, or 1538 having a size of nR×2N, a TU 1552 having a size of 2N×2N may be set if a TU size flag is 0, and a TU 1554 having a size of N/2×N/2 may be set if a TU size flag is 1.

Thus, in accordance with the present disclosure, the frame is divided into a plurality of maximum CUs (hereinafter interchangeably referred to a largest CU or LCU) having a maximum size and the LCUs are further hierarchically split into CUs of varying size according to a depth based on predetermined split information. The encoding of the LCUs and the CUs may be achieved by recursive scanning using a U-pattern. To this end, U-scan blocks are introduced or determined, which include a plurality of LCUs or CUs, such that each LCU or CU within the U-scan block is scanned using a U-pattern. In other words, a set of LCUs or CUs being scanned using a U-pattern are collectively referred to as U-scan block. As would be understood, the U-scan block can include any number of LCUs or CUs. However, a size of the U-scan block will be larger than a size of current LCU or CU being scanned. In one implementation, the size of the U-scan block is fixed as four (4) LCUs or CUs.

Figure 16:
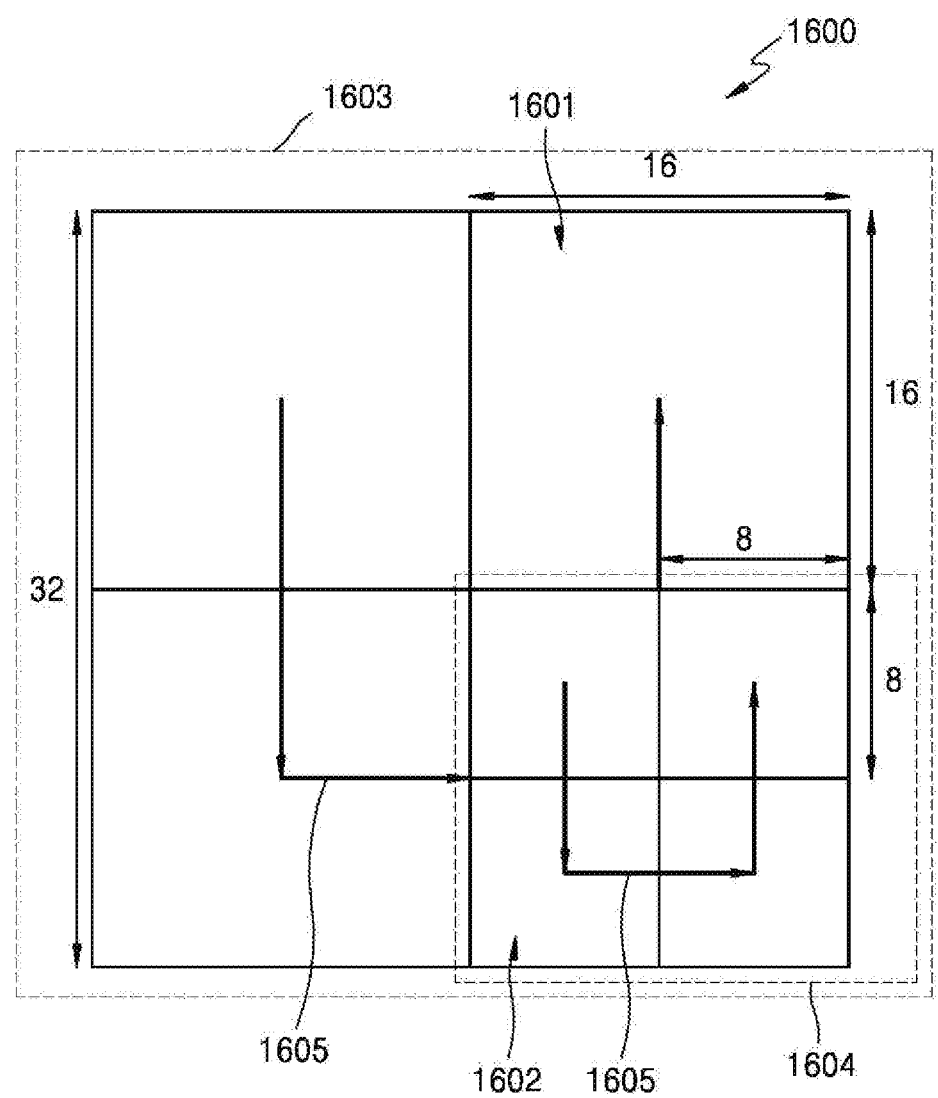

Accordingly, FIG. 16 illustrates an example scanning of hierarchically split CUs in an LCU 1600 using a U-pattern, in accordance with an example embodiment of the present disclosure. The LCU 1600 has maximum size of 32×32. The LCU 1600 is hierarchically split into four (4) CUs 1601 each having a size of 16×16 and one of the CUs 1601 having a size of 16×16 is further hierarchically split into four (4) CUs 1602 each having a size of 8×8. As described earlier, the U-pattern may be applied recursively to CUs at all levels inside a U-scan block. As such, a U-scan block 1603 (represented by dashed rectangle) comprising the CUs 1601 each having a size of 16×16 and a U-scan block 1604 (represented by dashed rectangle) comprising the CUs 1602 each having a size of 8×8 is introduced or determined. The U-scan block 1604 can also be referred to as a sub U-scan block. The scanning of the LCU 1600 begins from the top-left corner (e.g., the top-left CU included among the CUs 1601 having a size of 16×16) of the U-scan block 1603 using an upright U-pattern 1605 (as illustrated by the directional arrows). When the scanning reaches the CU 1601 having a size of 16×16 that is further hierarchically split into four (4) CUs 1602 each having a size of 8×8, the scanning of the four (4) CUs 1602 each having a size of 8×8 begins from the top-left corner (e.g., the top-left CU included among the CUs 1602 each having a size 8×8) of the U-scan block 1604 using an upright U-pattern 1605 (as illustrated by the directional arrows).

FIGS. 17, 18, 19, 20, 21, 22 and 23 describe an apparatus and a method for encoding a video, video encoding using a U-pattern, and an apparatus for decoding a video according to hierarchically split CUs, in accordance with an example embodiment of the present disclosure.

Figure 17:
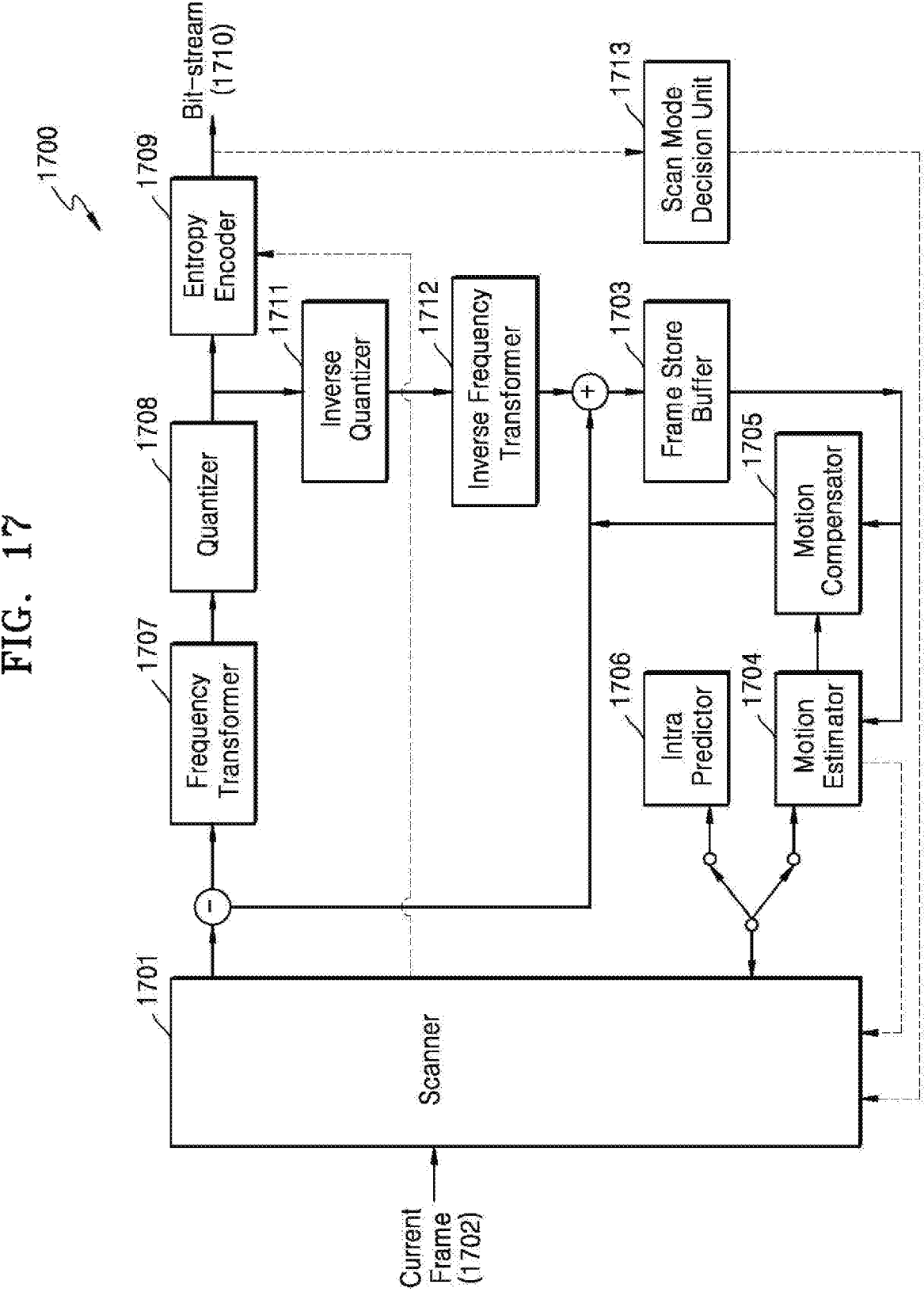
FIGS. 17, 18A, 18B, and 18C schematically illustrate an example encoder for encoding video, in accordance with the embodiment of the present disclosure.

FIG. 17 schematically illustrates an example video encoder 1700, hereinafter referred to as encoder 1700, for encoding video or an image in accordance with an example embodiment of the present disclosure. The encoder 1700 includes a splitter (not shown in FIG. 17) to split image data of the image into frames including a plurality of coding units (CU) of maximum size and minimum depth, as described in reference to FIGS. 9 to 16. A maximum size of the CUs is previously set in the encoder 1700. A depth (interchangeably referred to as a depth value) is set to 1 for a CU having a size equal to the maximum size. The CU having a size equal to the maximum size is interchangeably referred to as largest coding unit (LCU) or maximum coding unit (maximum CU). In addition, a split flag indicative of split information is set as 1 for the LCU, so that the LCU is divided further into smaller CUs.

Further, each of the LCUs may include deeper data units that are hierarchically split from the LCU according to varying depths. Since the LCU is hierarchically split according to depths, the image data of a spatial domain included in the LCU may also be hierarchically classified according to depths. The data unit may be either a CU, a prediction unit (PU), or a transformation unit (TU). Generally, a maximum depth that limits the height and width of the LCU that may be hierarchically split is previously set in the encoder 1700.

Further, the encoder 1700 may variously select a select a size or shape of the data unit for encoding the image data. In order to encode the image data, operations, such as prediction encoding, frequency transformation, and entropy encoding, are performed, and at such time, the same data unit may be used for all operations or different data units may be used for each operation. For example, the encoder 1700 may select not only a CU for encoding the image data, but also a data unit different from the CU to perform the prediction encoding on the image data in the CU, as described with reference to FIGS. 9 to 16. Generally, information about a partition type, information about a prediction mode, and information about a size of a TU for each LCU is previously set in the encoder 1700 based on smallest encoding error, as described in reference to FIGS. 9 to 11.

For encoding, the frames are input to a scanner 1701. The scanner 1701 may scan the frames sequentially. For each frame currently being scanned (e.g., the current frame 1702), the scanner 1701 may scan a data cluster in the current frame 1702 by adopting a scan pattern comprising at least one U-pattern. The U-pattern may be either an upright U-pattern or a rotated U-pattern, as described in reference to FIGS. 19 to 24 (explained in later paragraphs). Further, for example, the scan pattern may include one or more upright U-patterns, one or more rotated U-patterns, or a combination thereof.

Figure 18A:
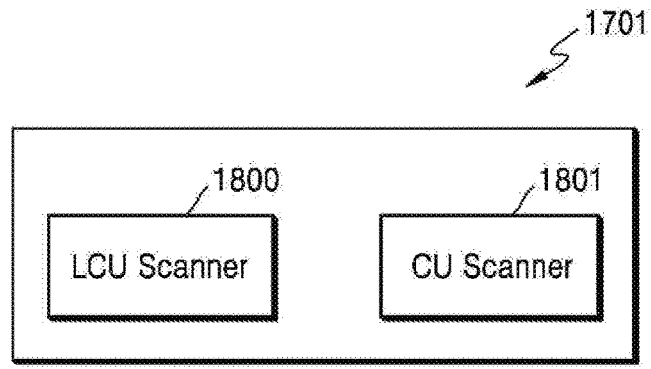

Referring to FIG. 18A, the scanner 1701 may include an LCU scanner 1800 which may scan a data cluster in the current frame 1702 and a CU scanner 1801 which may scan data units within the data cluster. The data cluster may be either an LCU, a portion of the LCU, or a CU itself. The data unit may be either a CU or a PU.

Figure 18B:
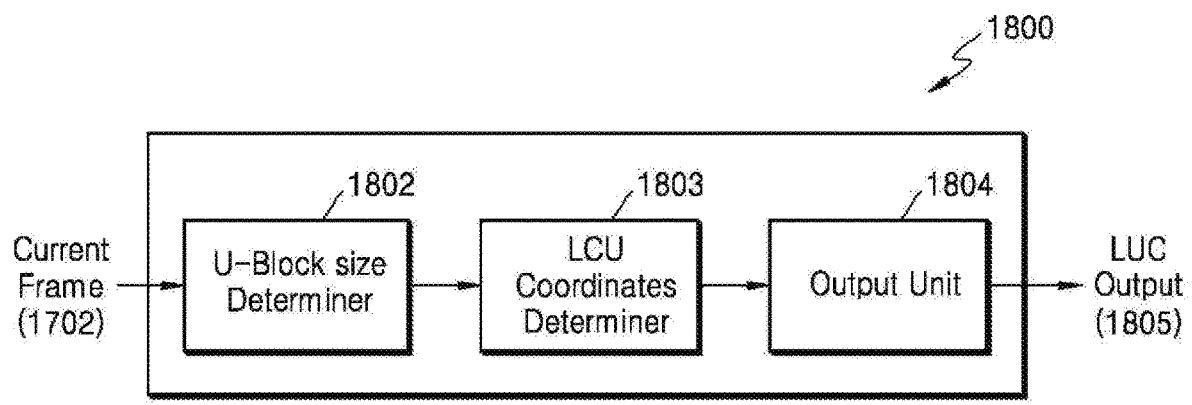

Referring to FIG. 18B, the LCU scanner 1800 includes a U-scan block size determiner 1802, an LCU coordinates determiner 1803, and an output unit 1804. As described earlier, a CU is hierarchically split according to varying depths and is scanned recursively using a U-pattern. Accordingly, the LCU scanner 1800 receives the current frame 1702 split into a plurality of LCUs. The U-scan block size determiner 1802 may group the LCUs in the current frame 1702 into a plurality of U-scan blocks based on a pre-stored U-scan block size. In one implementation, the size of a U-scan block is predetermined based on the size of cache available with the encoder 1700. The U-block size determiner 1802 may provide information about U-scan blocks to the LCU coordinates determiner 1803.

Thereafter, the LCU coordinates determiner 1803 may scan each U-block using a U-pattern starting from top-left LCU. The LCU coordinates determiner 1803 determines coordinates of LCUs within each U-block based on the sequential numbering or index of current LCUs inside each U-block in accordance with the U-pattern. The LCU coordinates determiner 1803 may then provide the coordinates of the current LCU to the output unit 1804. The output unit 1804 may then provide pixel data or image data from the current frame corresponding to the coordinates of the current LCU as LCU output 1805 to the CU scanner 1801.

Figure 18C:
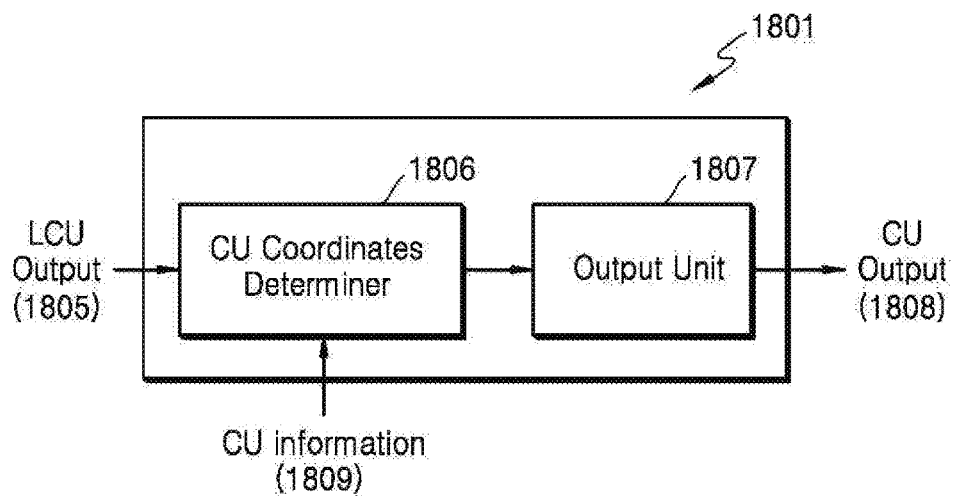

Referring to FIG. 18C, the CU scanner 1801 may include a CU coordinates determiner 1806 and an output unit 1807. Upon receiving the LCU output 1805 from the LCU scanner 1800, the CU coordinates determiner 1806 may split the current LCU having a depth of 1 into a plurality CUs by increasing the depth value by 1. Thereafter, the CU coordinates determiner 1806 may scan the plurality of CUs using the U-pattern from the top-left CU. The CU coordinates determiner 1806 may determine coordinates of CUs within the current LCU based on the sequential numbering or index of current CUs in accordance with the U-pattern. The CU coordinates determiner 1806 may then provide the coordinates of the CUs to the output unit 1807. The output unit 1807 may then provide pixel data or image data from the current frame corresponding to the coordinates of the CUs as CU output 1808 for prediction encoding and frequency transformation.

Figure 19:
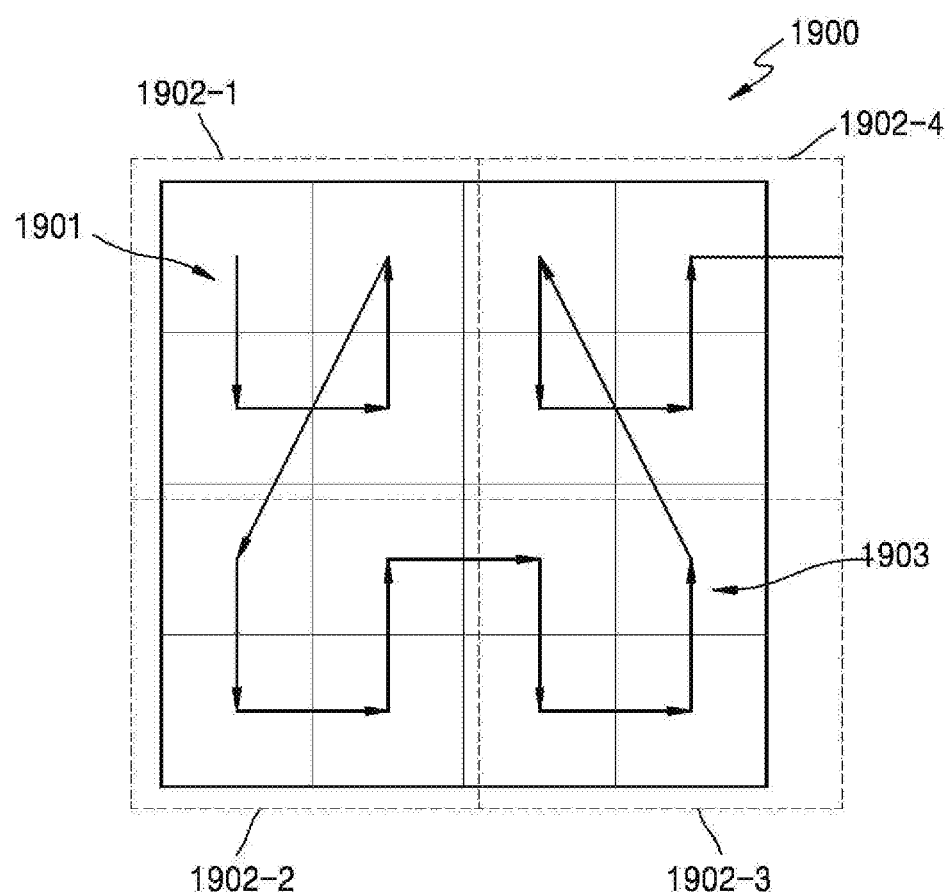

FIG. 19 illustrates a first example scanning 1900 of a plurality of LCUs 1901 by determining a U-scan block 1902 including 4 LCUs each, in accordance with the present disclosure. For the sake of convenience, only four (4) U-scan blocks 1902-1, 1902-2, 1902-3, and 1902-4 are illustrated. In the example of FIG. 19, each of the U-scan blocks is scanned using an upright U-pattern. The scanning of each U-scan block starts from the top-left LCU within each U-scan block, as described in reference to FIG. 6. Further, the scanning of the U-scan blocks 1902-1 through 1902-4 is also performed by adopting the upright U-pattern and the scanning starts at the top-left U-scan block 1902-1, as described in reference to FIG. 6. As may be observed, the scanning begins from U-scan block 1902-1 at the top left corner, and proceeds in a vertical downward direction to U-scan block 1902-2, in a horizontal rightward direction to U-scan block 1902-3, and in a vertical upward direction to U-scan block 1902-4 (as illustrated by the directional arrows).

Figure 20:
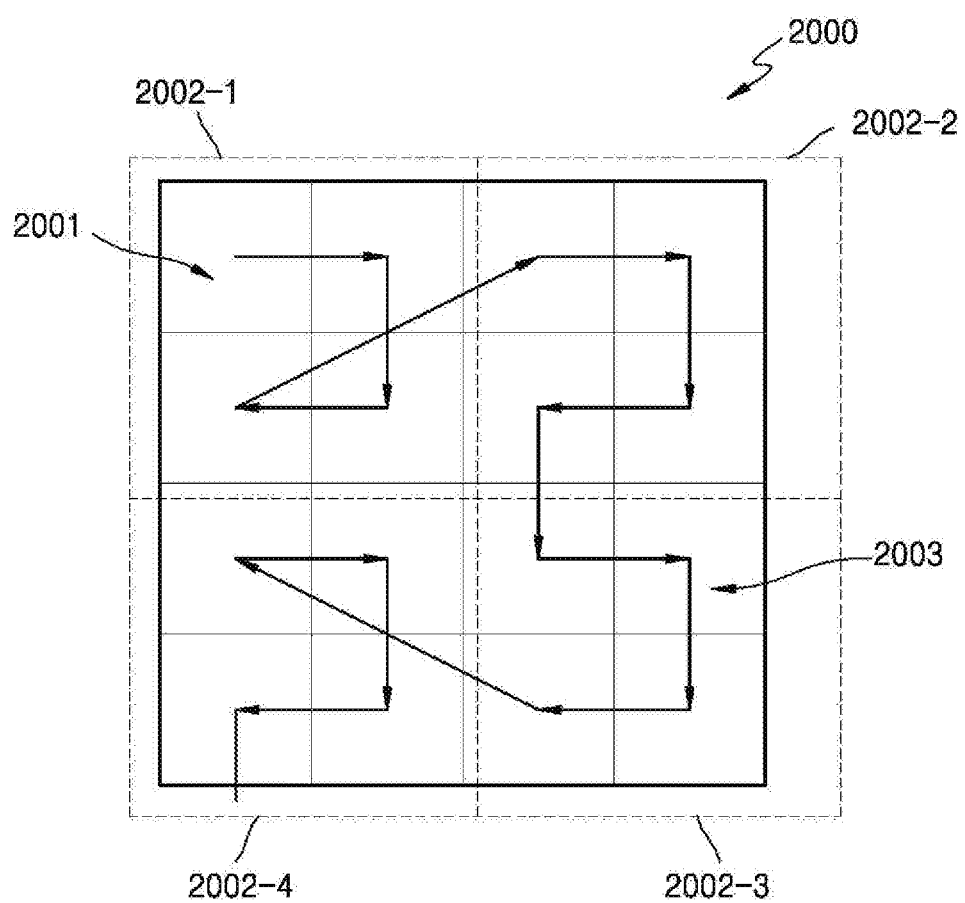

FIG. 20 illustrates a second example scanning 2000 of a plurality of LCUs 2001 by determining a U-scan block 2002 including 4 LCUs each, in accordance with the present disclosure. For the sake of convenience, only 4 U-scan blocks 2002-1, 2002-2, 2002-3, and 2002-4 are illustrated. In the example of FIG. 20, each of the U-scan blocks is scanned using a rotated U-pattern. The scanning of each U-scan block starts from the top-left LCU within each U-scan block, as described in reference to FIG. 7. Further, the scanning of the U-scan blocks 2002-1 through 2002-4 is also performed by adopting the rotated U-pattern and the scanning starts at the top-left U-scan block 2002-1, as described in reference to FIG. 7. As may be observed, the scanning begins from U-scan block 2002-1 at the top left corner, and proceeds in a horizontal rightward direction to U-scan block 2002-2, in a vertical downward direction to U-scan block 2002-3, and in a horizontal leftward direction to U-scan block 2002-4 (as illustrated by the directional arrows).

Figure 21:
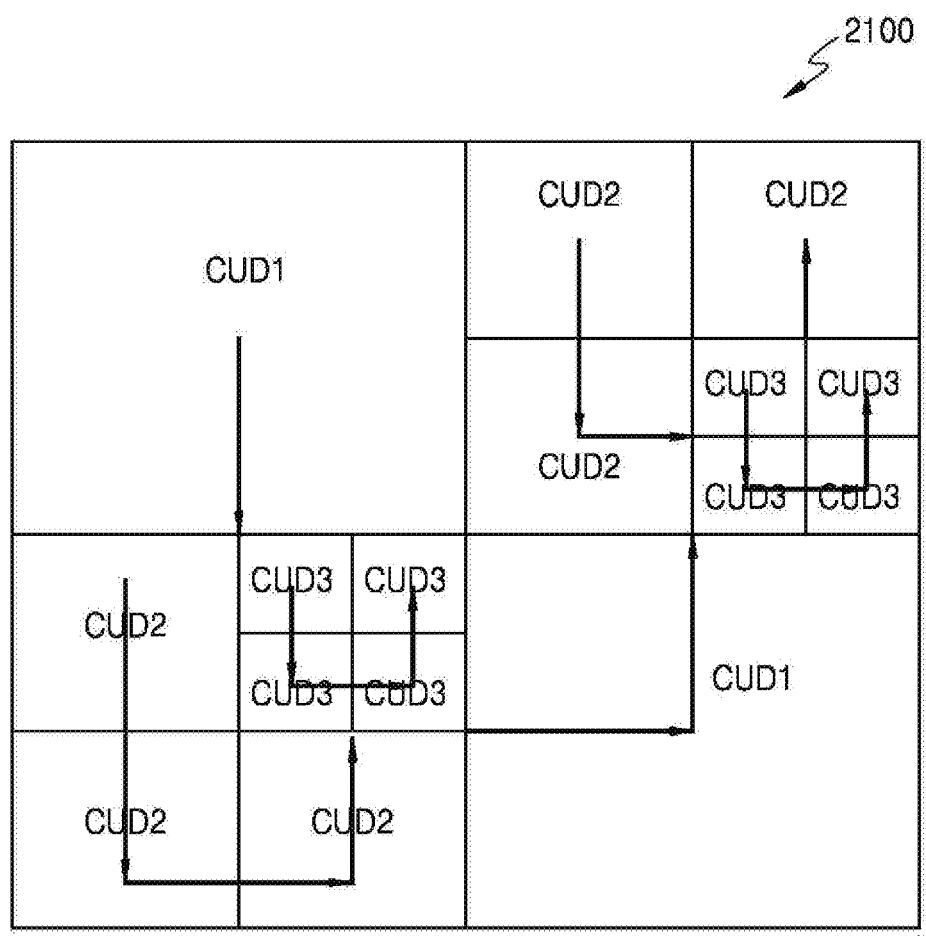

FIG. 21 illustrates a third example scanning 2100 of hierarchically split LCUs 1901 and 2001, in accordance with the present disclosure. In FIG. 21, reference numbers 1901 and 2001 are omitted for ease of reference. For ease of reference, in FIG. 21, only one LCU is illustrated. The LCU is hierarchically split into a plurality of CUs of varying depths D. The depth value of D may be in the range of 1 to N, where N is an integer. For the sake of brevity, the different depth values of each CU are labeled as D1, D2, D3, and D4. In FIG. 21, the LCU is scanned using an upright U-pattern starting from the top-left CU. Accordingly, the CUs are recursively scanned in accordance with depth and the upright U-pattern (as illustrated by the directional arrows). For the sake of brevity and clarity, ends of the U-patterns between the CUs are not connected. However, it would be understood that the U-patterns would be connected in a manner as illustrated in FIGS. 19 and 20.

Figure 22:
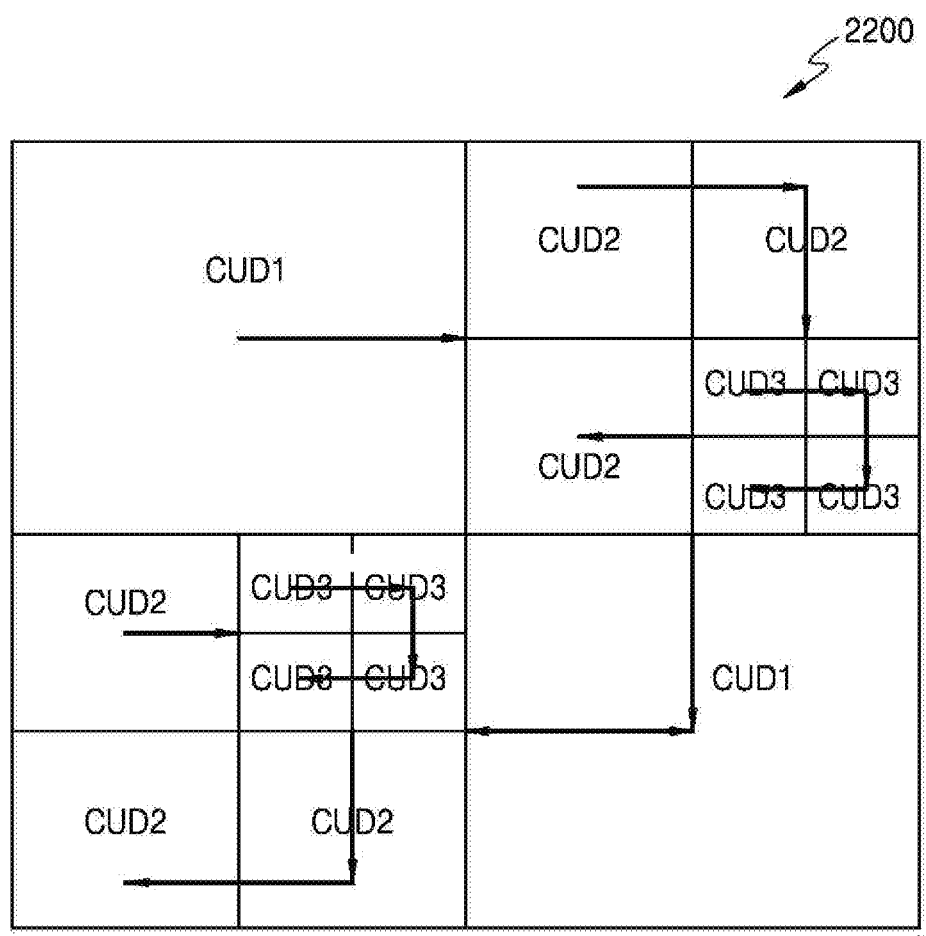

FIG. 22 illustrates a fourth example scanning 2200 of hierarchically split LCU 1901 and 2001, in accordance with the present disclosure. In FIG. 22, reference numbers 1901 and 2001 are omitted for ease of reference. For ease of reference, in FIG. 22, only one LCU is illustrated. The LCU is hierarchically split into a plurality of CUs of varying depths D. The depth value of D may be in the range of 1 to N, where N is an integer. For the sake of brevity, the different depth values of each CU are labeled as D1, D2, D3, and D4. In FIG. 22, the LCU is scanned using a rotated U-pattern starting from the top-left CU. Accordingly, the CUs are recursively scanned in accordance with depth and the rotated U-pattern (as illustrated by the directional arrows). For the sake of brevity and clarity, the ends of U-patterns between the CUs are not connected. However, it would be understood that the U-patterns would be connected in a manner as illustrated in FIGS. 19 and 20.

Thus, by hierarchically splitting the LCUs within the current frame into CUs of varying depth and recursively scanning such CUs using a U-pattern provides memory bandwidth advantage and improves coding efficiency in a manner similar to scanning LCUs using the U-pattern, as described with reference to FIGS. 8A, 8B, 8C, and 8D.

Referring to FIG. 18B again, as described earlier, the U-scan block size determiner 1802 may group the LCUs in the current frame 1702 into a plurality of U-scan blocks based on a pre-stored U-scan block size. However, it is possible that some of the LCUs are unable to be grouped into the U-scan blocks. Accordingly, the LCU coordinates determiner 1803 may scan such LCUs using any pattern such as an upright U-pattern, a rotated U-pattern, a Z-pattern, and a raster scan pattern. The LCU coordinates determiner 1803 accordingly may provide the output 1805 to the CU scanner 1801.

Further, the U-scan block size determiner 1802 may group the LCUs in the current frame 1702 into a plurality of sub U-scan blocks within in each U-scan block based on a pre-stored sub U-scan block size. Each of the LCUs within the sub U-scan block is scanned using a U-pattern, in a manner similar to scanning LCUs within the U-scan blocks, as described earlier. Grouping of the LCUs within the sub U-scan blocks and scanning the LCUs within the sub U-scan block enables better coding of image data having higher resolution and improves coding efficiency.

Furthermore, in a manner similar to the U-scan block, it is possible that some of the LCUs are unable to be grouped into the sub U-scan blocks. Accordingly, the LCU coordinates determiner 1803 may scan such LCUs using any pattern such as an upright U-pattern, a rotated U-pattern, a Z-pattern, and a raster scan pattern. The LCU coordinates determiner 1803 accordingly may provide the output 1805 for prediction encoding and frequency transformation.

FIG. 23 illustrates a fifth example scanning 2300 of a plurality of LCUs, LCU0 through LCU28 by determining a U-scan block 2301 having a size of 4. Referring to FIG. 23A, LCU0, LCU1, LCU5, and LCU6 are grouped within the U-scan block 2301. As described, LCU0, LCU1, LCU5, and LCU6 within the U-scan block 2301 are scanned using a U-pattern (as illustrated by the directional arrows). In the present example, the U-pattern is an upright U-pattern. However, LCU2 through LCU4, LCU7 through LCU5, and LCU10 through LCU28 are not grouped in the U-scan block 2301. Thus, the LCUs outside the U-scan block 2301 may be scanned using any pattern.

Figure 23B:
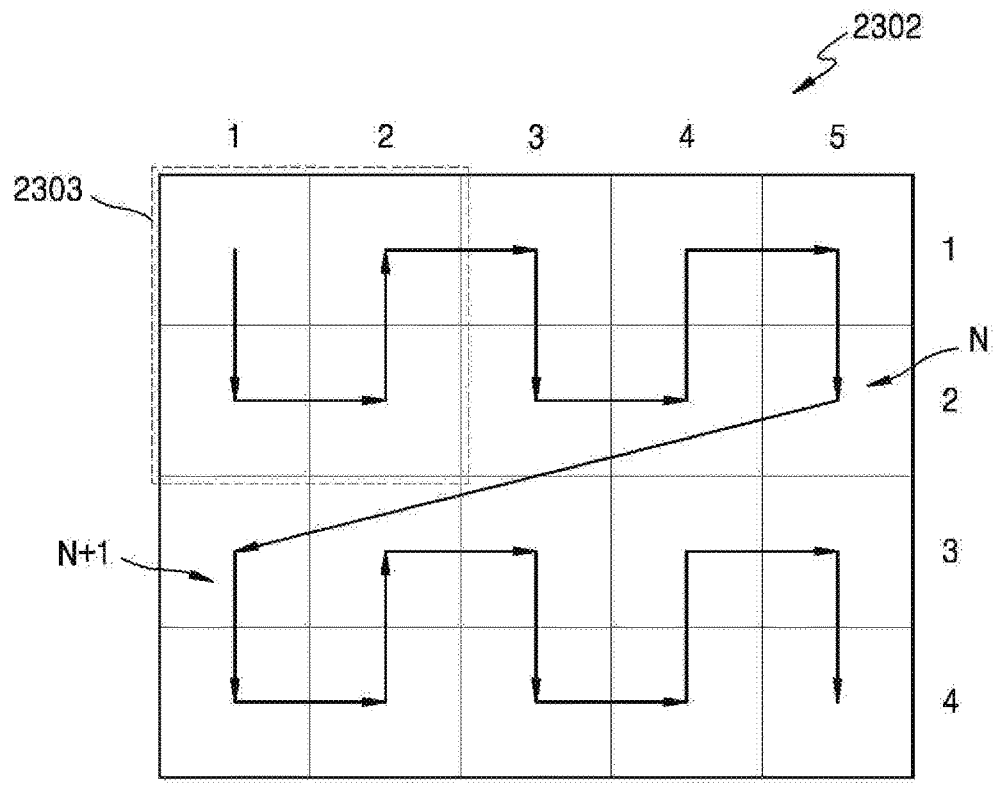

In one implementation, the scanning of LCUs outside the U-scan block is based on geometry of the frame. FIG. 23B illustrates one example of a frame 2302 having odd geometry, i.e., having 4 rows and 5 columns (represented by reference numerals). The LCUs inside a U-scan block 2303 are scanned using an upright U-pattern (as illustrated by the directional arrows). The LCUs outside the U-scan block 2303 may be scanned using any U-pattern such as, for example, upright, inverted, or rotated U-patterns. Therefore, upon scanning LCU N in a row and in the rightmost column, i.e. in row 2 and column 5, an LCU in the leftmost column and in the next row, i.e., in row 3 and column 1, is selected as LCU N+1 for scanning (as illustrated by the directional arrows).

Figure 23C:
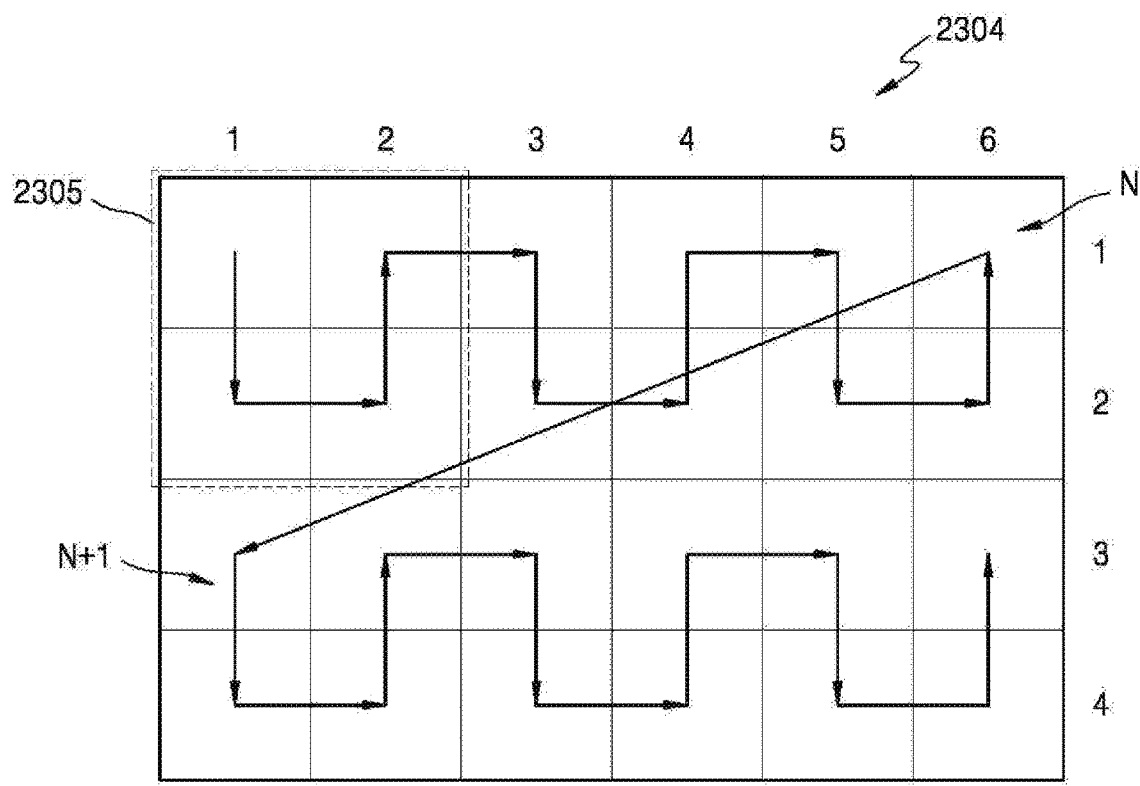

Similarly, FIG. 23C illustrates another example of a frame 2304 having even geometry, i.e., having 4 rows and 6 columns (represented by reference numerals). The LCUs inside a U-scan block 2305 are scanned using an upright U-pattern (as illustrated by the directional arrows). The LCUs outside the U-scan block 2305 may be scanned using any U-pattern such as, for example, upright, inverted, or rotated U-patterns. Therefore, upon scanning LCU N in a row and in the rightmost column, i.e. in row 1 and column 5, an LCU in the leftmost column and in the next row, i.e., in row 3 and column 1, is selected as LCU N+1 for scanning (as illustrated by the directional arrows).

Figure 24A:
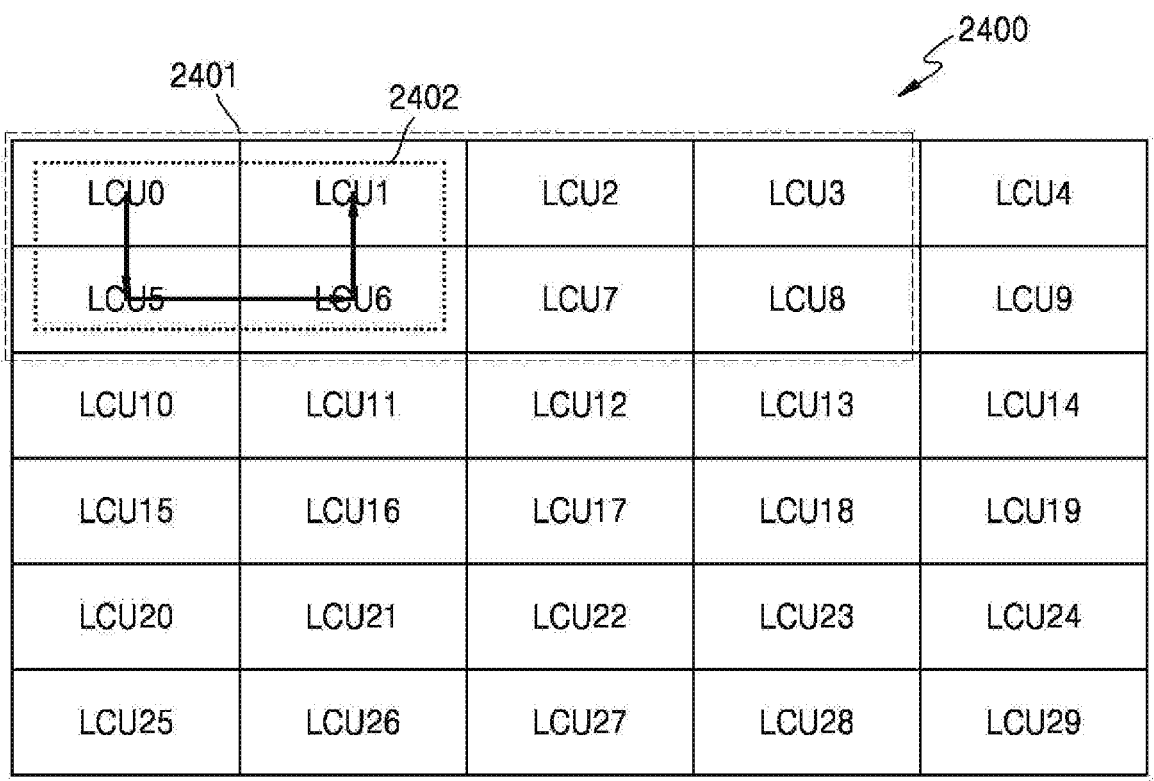

FIGS. 24A, 24B, 24C and 24D illustrate a sixth example scanning 2400 of a plurality of LCUs, LCU0 through LCU28 by determining a U-scan block 2401 having a size of 8 and sub U-scan block 2402 having a size of 4. Referring to FIG. 24A, LCU0, LCU1, LCU2, LCU3, LCU5, LCU6, LCU7, and LCU8 are grouped within the U-scan block 2401. LCU0, LCU1, LCU5, and LCU6 are grouped within the sub U-scan block 2402. As described, LCU0, LCU1, LCU5, and LCU6 within the sub U-scan block 2402 are scanned using a U-pattern (as illustrated by the directional arrows). In the present example, the U-pattern is an upright U-pattern. However, LCU2, LCU3, LCU7, and LCU8 are not grouped within the sub U-scan block 2402. Thus, the LCUs outside the sub U-scan block 2402 may be scanned using any pattern. Likewise, LCU4, LCU7 LCU9, and LCU10 through LCU28 are not grouped in the U-scan block 2401. Thus, the LCUs outside the U-scan block 2401 may be scanned using any pattern.

Figure 24B:
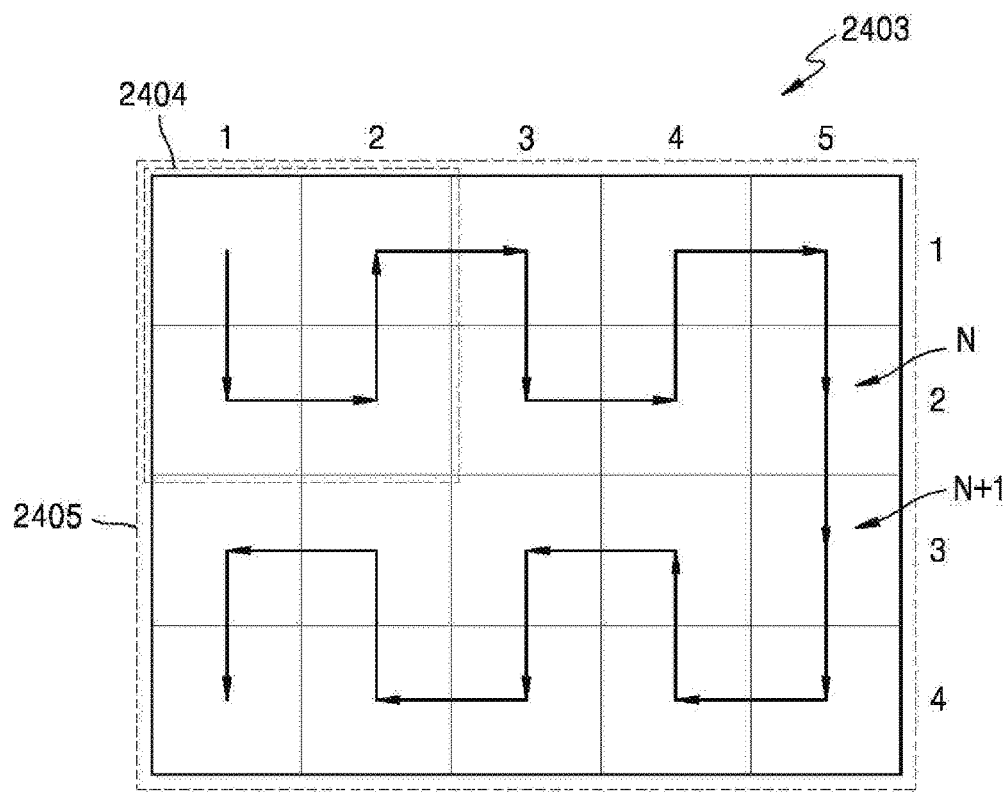

In one implementation, the scanning of LCUs outside the U-scan block is based on geometry of the frame. FIG. 24B illustrates one example of a frame 2403 having odd geometry, i.e., having 4 rows and 5 columns (represented by reference numerals). The LCUs inside a sub U-scan block 2404 are scanned using an upright U-pattern (as illustrated by the directional arrows). The LCUs outside the sub U-scan block 2404 and inside a U-scan block 2405 may be scanned using any U-pattern such as, for example, upright, inverted, or rotated U-patterns. Therefore, upon scanning LCU N in a row and the rightmost column, i.e. in row 2 and column 5, an LCU in the same rightmost column and in the next row, i.e., in row 3 and column 5, is selected as LCU N+1 for scanning (as illustrated by the directional arrows).

Figure 24C:
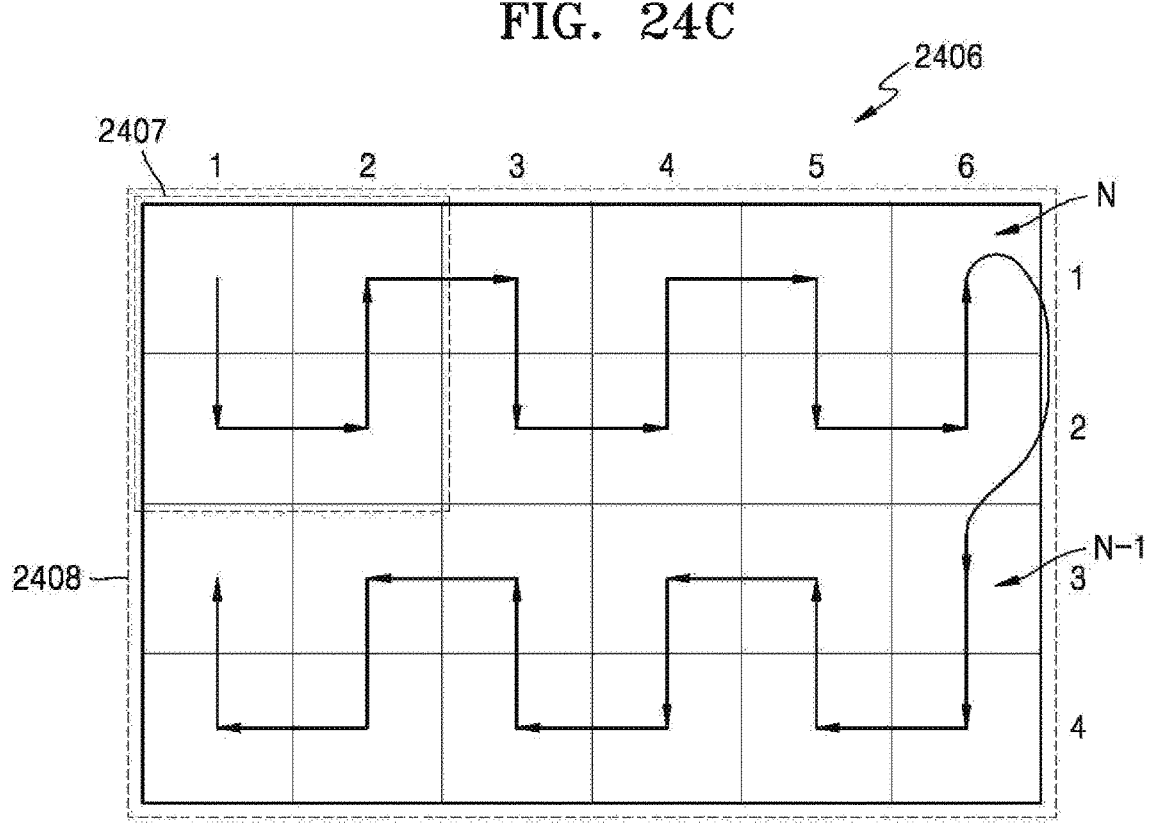

Similarly, FIG. 24C illustrates another example of a frame 2406 having even geometry, i.e., having four (4) rows and six (6) columns (represented by reference numerals). The LCUs inside a sub U-scan block 2407 are scanned using an upright U-pattern (as illustrated by the directional arrows). The LCUs outside the sub U-scan block 2407 and inside a U-scan block 2408 may be scanned using any U-pattern such as, for example, upright, inverted, or rotated U-patterns. Therefore, upon scanning LCU N in a row and in the rightmost column, i.e. in row 1 and column 6, LCU in the same rightmost column and in the next row, i.e., in row 3 and column 6, is selected as LCU N+1 for scanning (as illustrated by the directional arrows).

Thereafter, the encoder 1700 may perform prediction encoding and frequency transformation. Accordingly, the encoder 1700 may remove temporal redundancy by using motion estimation process, in which a block in current frame is predicted from pixels in a frame coded previously. Such previously coded frames are also called reference frames. Accordingly, the reference frames may be stored in a frame store buffer 1703. As such, a motion estimator 1704 and a motion compensator 1705 may perform motion estimation and motion compensation on CUs as identified in the CU output 1808 in an inter mode by using the current frame 1702 and a reference frame stored in the frame store buffer 1704.

Further, the motion estimator 1704 may determine encoding error for CUs to select a CU with the smallest encoding error as a basis unit for frequency transformation, as described earlier with reference to FIGS. 9 to 16. Accordingly, the motion estimator 1704 may set the split flag indicative of split information for the current CU as 1 and provide corresponding CU information to the CU scanner 1801 to provide further pixel data corresponding to further split CUs. The CU information may include split flag set as 1 for the current CU, depth value for the current CU, and index of the current CU.

Accordingly, referring to FIG. 18C again, the CU coordinates determiner 1806 receives CU information 1809 from the motion estimator 1704. The CU information 1808, as described earlier, may include split flag set as 1 for the current CU, depth value for the current CU, and index of the current CU. Upon receiving the CU information 1808, the CU coordinates determiner 1806 may determine whether a depth of the current CU is greater than two (2). Upon determining the depth is 2 or greater than 2, the CU coordinates determiner 1806 may hierarchically split the CU into deeper CUs according to the received depth value in the CU information 1809. The CU coordinates determiner 1806 may scan the deeper CUs using a U-pattern and provide coordinates for the deeper CU, as described earlier. The output unit 1807 may then provide pixel data corresponding to the coordinates for the deeper CU as the CU output 1808 to the motion estimator 1704. The recursive splitting of the CUs may be continued until a maximum depth is obtained. The maximum depth is provided as the CU information 1809 to the CU scanner 1801. Thus, the depth value of CU including the LCU ranges from 1 to N, where N is a positive integer.

As described in reference to FIGS. 9 to 15, a CU with the smallest encoding error is selected as a basis unit for prediction encoding and frequency transformation. Therefore, the motion estimator 1704 may determine encoding error for CUs of each depth value and select a CU with the smallest encoding error as a basis unit for prediction encoding and frequency transformation. Accordingly, the motion estimator 1704 may set the depth of the CU having smallest encoding error as the coded depth and set the split flag indicative of split information for the CU as 0. For other CUs, the motion estimator 1704 may set the split flag indicative of split information for the CU as 1. This information is included in a bit-stream.

Further, the encoder 1700 may remove spatial redundancy by using intra prediction, which predicts current block pixels from nearby located blocks in a frame. Accordingly, the output unit 1807 of the CU scanner 1801 may provide the CU output 1808 to an intra predictor 1706. The intra predictor 1706 may perform intra prediction on CUs in an intra mode, in accordance with the CU output 1808.

As described earlier in reference to FIGS. 9 to 15, prediction encoding may be performed on a CU that is no longer split. Such a CU becomes a basis unit for prediction encoding and is referred to as a PU. Thus, the intra predictor 1706 may determine the CU having the coded depth as a PU, split the PU recursively into partition types, and scan the PUs using the U-pattern. Further, the intra predictor 1706 may scan the TUs in a manner as known in the art.

Since the predictions (both spatial and temporal) are not exact, a difference (also called residual) between the predicted and actual pixels is generated. The residual is converted into frequency coefficients and then the frequency coefficients are quantized. Accordingly, outputs from the intra predictor 1706, the motion estimator 1704, and the motion compensator 1705 are provided to the frequency transformer 1707 and a quantizer 1708 to obtain a quantized transformation coefficient. In one example, the frequency transformer 1707 may employ discrete cosine transform (DCT) for processing pixel data. The quantized transformation coefficients are entropy encoded by an entropy encoder 1709 to generate a bit-stream 1710. In one example, a CABAC entropy coding scheme is for entropy coding by the entropy encoder 1709 in accordance with latest video coding standards, such as HEVC.

In addition, the bit-stream 1710 may include size information of each of the LCUs and encoded data of each of the LCUs. The encoded data of the LCUs may include depth information for determining the CUs having the hierarchical structure, prediction mode information of each of the CUs, and residual information of the CUs. Further, bit-stream 1710 may also include the type of pattern used for scanning the LCUs and the deeper CUs. As such, the scanner 1701 may provide the pattern information to the entropy encoder 1709, which encapsulates the pattern information in the bit-stream 1710.

Further, the quantized transformation coefficients are restored as data in a spatial domain through an inverse quantizer 1711 and an inverse frequency transformer 1712. The restored data in the spatial domain is output as the reference frame and stored in the frame store buffer 1704. The reference frame may be used in predicting the next frame.

Furthermore, the encoded data is provided to a scan mode decision unit 1713. The scan mode decision unit 1713 may determine a U-pattern to be used for scanning the data units based on the encoded data and smallest encoding error. In one implementation, the U-pattern may be an upright U-pattern or a rotated U-pattern.

Thus, the scanning of data clusters such as LCUs and scanning of data units such as CUs and PUs, using the U-pattern enables a large number of neighbors for prediction, thereby increasing the number of predictors for prediction encoding and resulting in better coding efficiency.

Further, in one implementation, the entropy encoding may be performed by using the CABAC entropy encoding scheme in accordance with latest video coding standards such HEVC. As would be understood, the CABAC encoding scheme utilizes probability states of various syntax elements/symbols for entropy coding and calculation of correct probability state is critical for achieving higher compression. These probability states are saved as context tables and are updated depending upon the value of current symbol. This frequent updating of probability states improves the efficiency of CABAC compression. In addition, syntax elements of neighboring CUs generally have similar values and therefore if the previously CUs are spatially close to current CU being scanned, the efficiency of CABAC compression is improved.

Figure 25A:
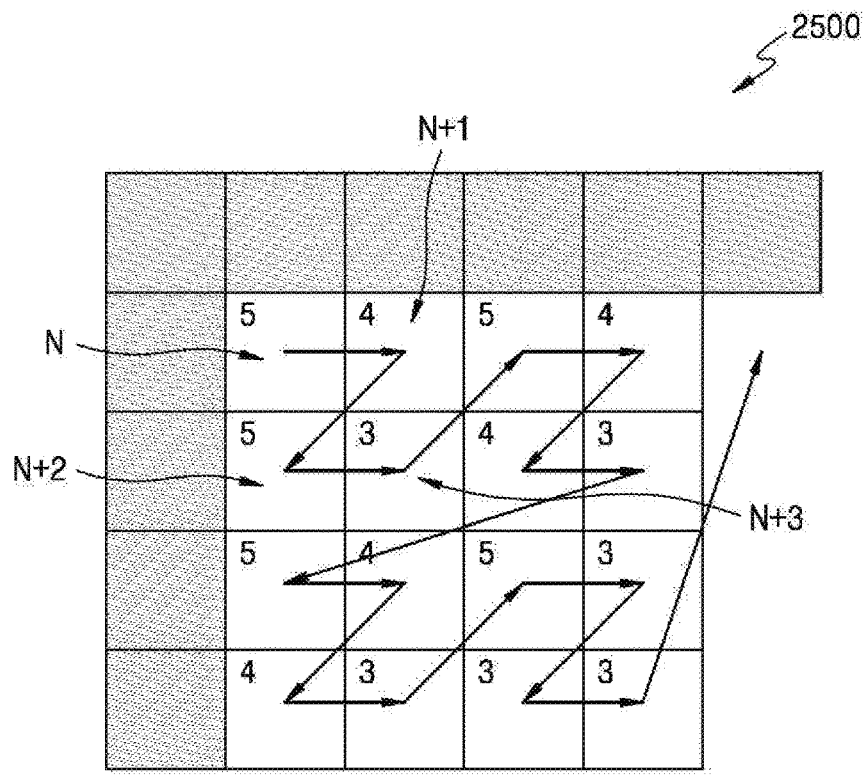
Figure 25B:
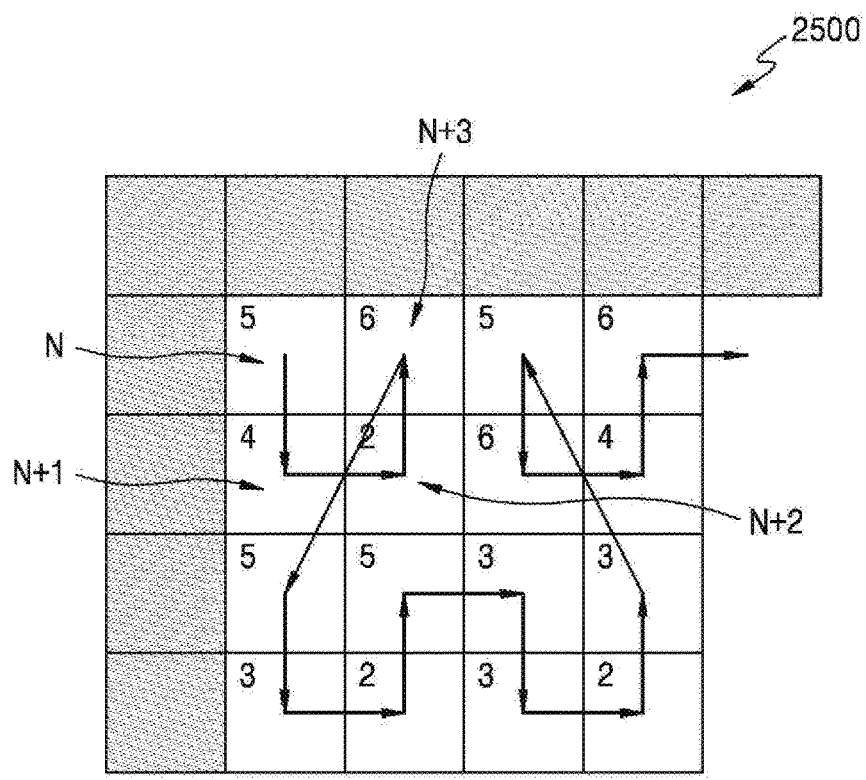

Therefore, since U-pattern scanning enables availability of large number of neighbors, CABAC entropy jumps indicative of difference between spatial locations of any two CUs is smaller and as a result, a higher CABAC compression is achieved. Accordingly, FIGS. 25A and 25B illustrate an example comparison 2500 of CABAC entropy jumps between CUs within an LCU while using existing Z-patterns and U-patterns. The CABAC entropy jumps are illustrated using directional arrows, which also represent the pattern used for scanning the CUs. Numerals within the CU represent the number of previously scanned neighbors using the pattern. The shaded square units are indicative of previously scanned CUs.

Figure 2:
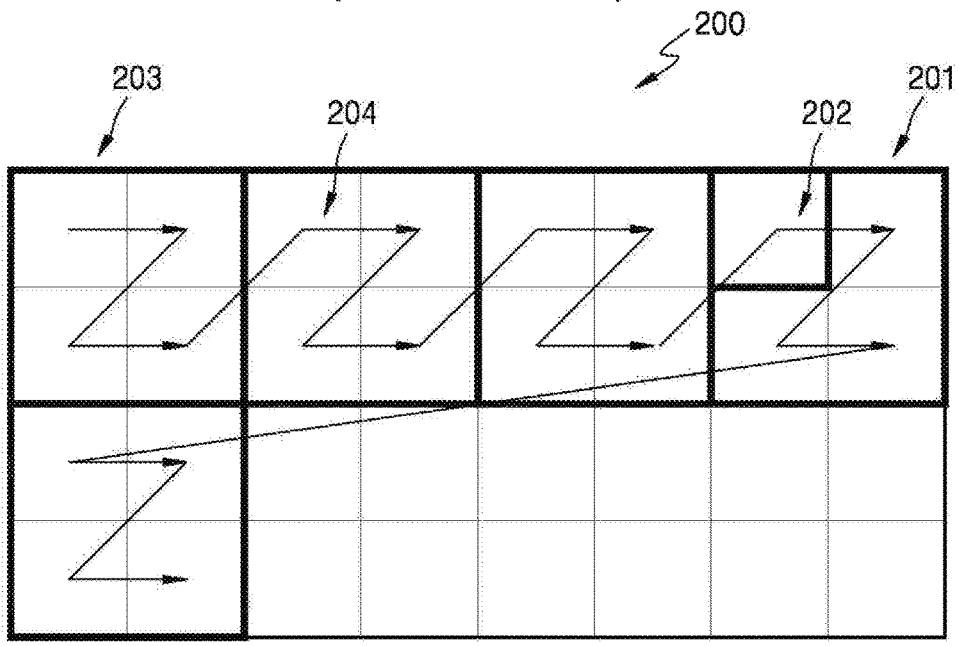
Figure 3A:
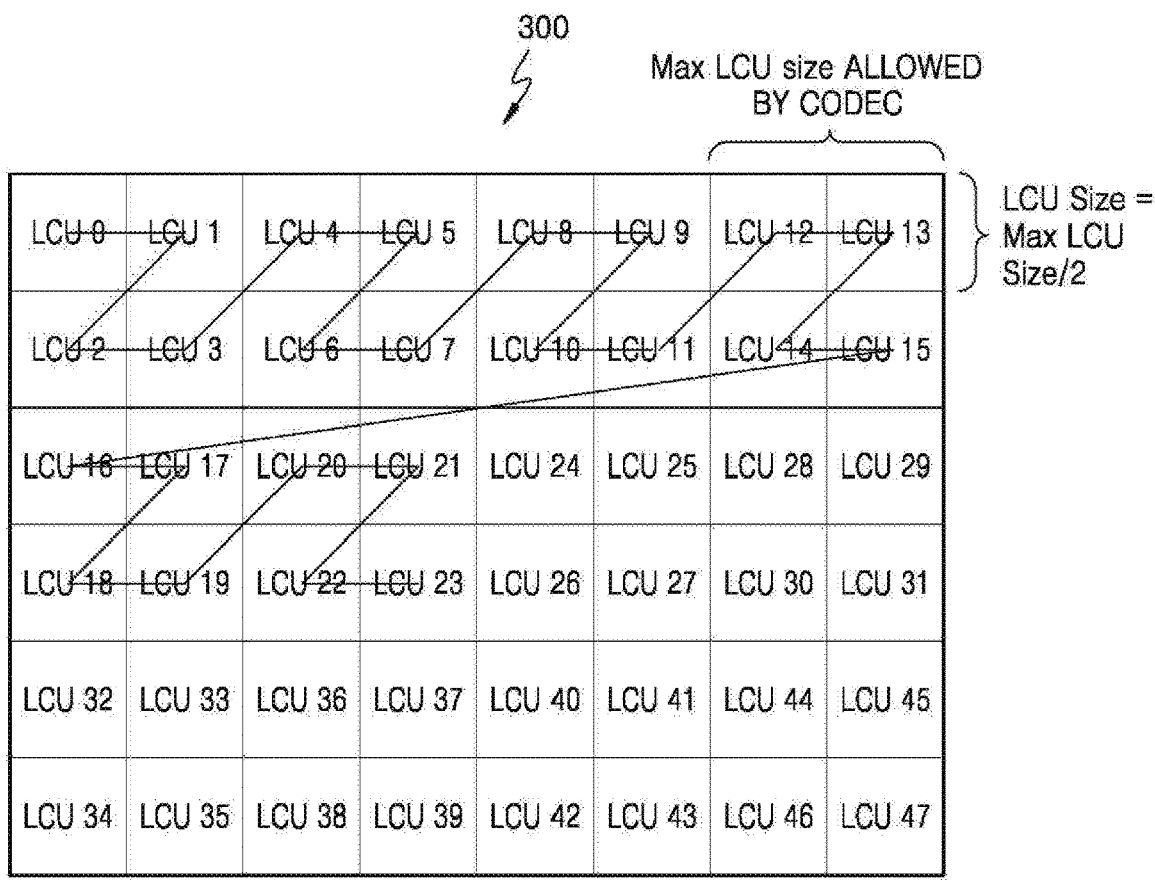

Referring to FIG. 25A, CUs in a frame are grouped within a Z-scan block having a size of 4 and scanned using a Z-pattern, as illustrated in FIG. 2. As may be gathered from the figure, five (5) neighboring previously scanned CUs are available for scanning the current CU N; four (4) neighboring previously scanned CUs are available for scanning the current CU N+1; five (5) neighboring previously scanned CUs are available for scanning the current CU N+2; and three (3) neighboring previously scanned CUs are available for scanning the current CU N+3. Therefore, the total number of neighbors for prediction is given as 5*5+4*5+3*6=63. Further, a horizontal CABAC entropy jump is given a weight of 1; a diagonal CABAC entropy jump within the Z-scan block and between Z-scan block at same horizontal level is given a weight of $\sqrt{2}$; and a diagonal CABAC entropy jump between Z-scan block at row switching is given a weight of $\sqrt{10}$. Therefore, the total weight of the CABAC entropy jumps is given as 1*8+$\sqrt{2}$*6+$\sqrt{10}$*2=22.81.

Referring to FIG. 25B, CUs in a frame are grouped within a U-scan block having a size of 4 and scanned using a U-pattern (as illustrated by the directional arrows). As may be gathered from the figure, five (5) neighboring previously scanned CUs are available for scanning the current CU N; four (4) neighboring previously scanned CUs are available for scanning the current CU N+1; two (2) neighboring previously scanned CUs are available for scanning the current CU N+2; and six (6) neighboring previously scanned CUs are available for scanning the current CU N+3. Therefore, the total number of neighbors for prediction is given as 6*3+5*4+4*2+3*4+2*3=64. Further, a horizontal CABAC entropy jump is given a weight of 1; and a diagonal CABAC entropy jump between U-scan blocks is given a weight of $\sqrt{5}$. Therefore, the total weight of the CABAC entropy jumps is given as 1*14+$\sqrt{5}$*2=18.48.

As may be gathered from above, the total number of neighbors for prediction available in a Z-pattern is less than the total number of neighbors for prediction available in a U-pattern. On the contrary, the total number of CABAC entropy jumps available in a Z-pattern is higher than the total number of CABAC entropy jumps available in a U-pattern. Thus, a U-pattern provides a higher CABAC compression efficiency than a Z-pattern.

In addition, the maximum number of neighbor CUs for a current CU is limited to 5 while adopting Z-pattern. On the contrary, the maximum number of neighbor CUs for a current CU is 6 while adopting a U-pattern. In addition referring to FIG. 25B, in the case of CU N and CU N+3, neighboring CUs include CUs that are spatially below the current CU. This provides new prediction direction, which is not available in a Z-pattern.

Figure 26:
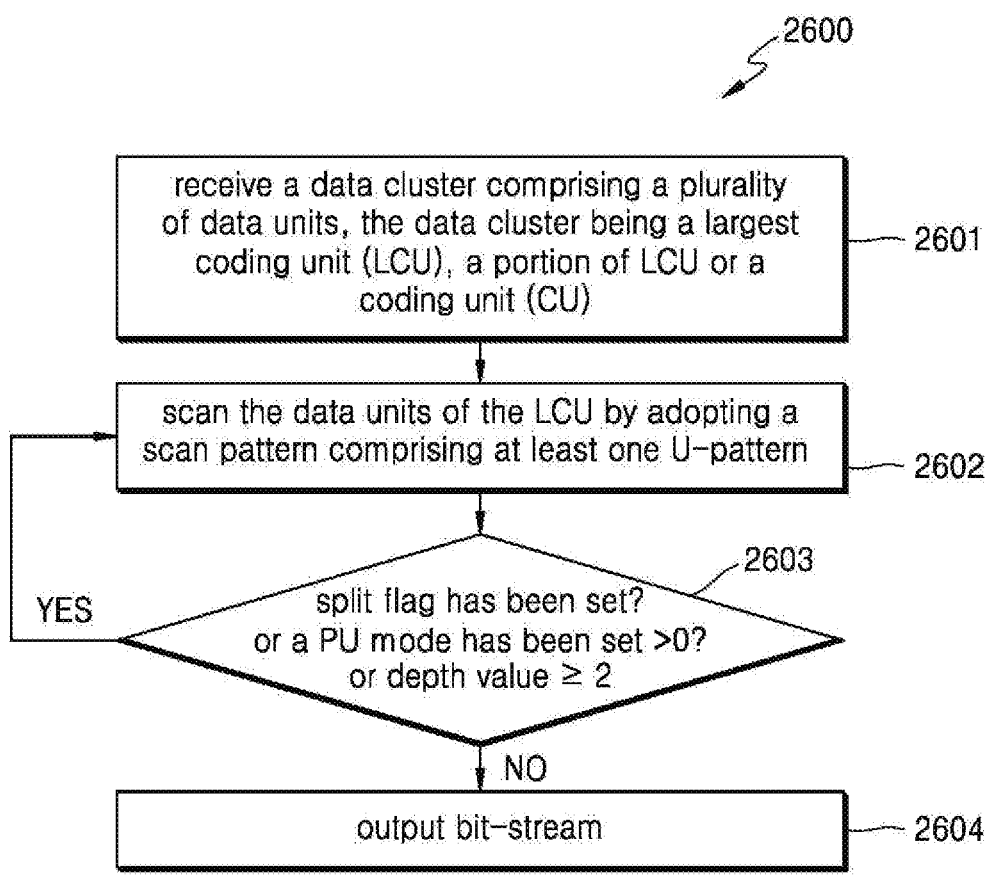
FIG. 26 is a flow diagram illustrating an exemplary method for encoding video, in accordance with one aspect of an example embodiment of present disclosure.

Further, FIG. 26 illustrates a flow diagram illustrating an exemplary method 2600 for encoding video, in accordance with one aspect of the embodiment of present disclosure. The order in which the method is described is not intended to be construed as a limitation, and any number of the described method blocks may be combined in any order to implement the method, or an alternative method. Additionally, individual blocks may be deleted from the method without departing from the spirit and scope of the subject matter described herein. Furthermore, the method may be implemented in any suitable hardware, software, firmware, or combination thereof.

At step 2601, a data cluster comprising a plurality of data units is received. The data cluster may be either a largest coding unit (LCU), a portion of an LCU, or a coding unit (CU). The data unit may be either a coding unit (CU) or a prediction unit (PU).

At step 2602, the data units of the LCU are scanned by adopting a scan pattern comprising at least one U-pattern. The U-pattern may be either an upright U-pattern or a rotated U-pattern. The data units may each have a depth value in the range of 1 to N, wherein N is an integer.

At step 2603, a determination of whether (1) a split flag has been set; (2) a PU mode has been set greater than 0; or (3) depth is 2 in respect of a data unit being scanned currently is made.

Upon positive determination, then method flows to block 2602, where the data unit is recursively scanned by adopting a U-pattern.

Figure 27:
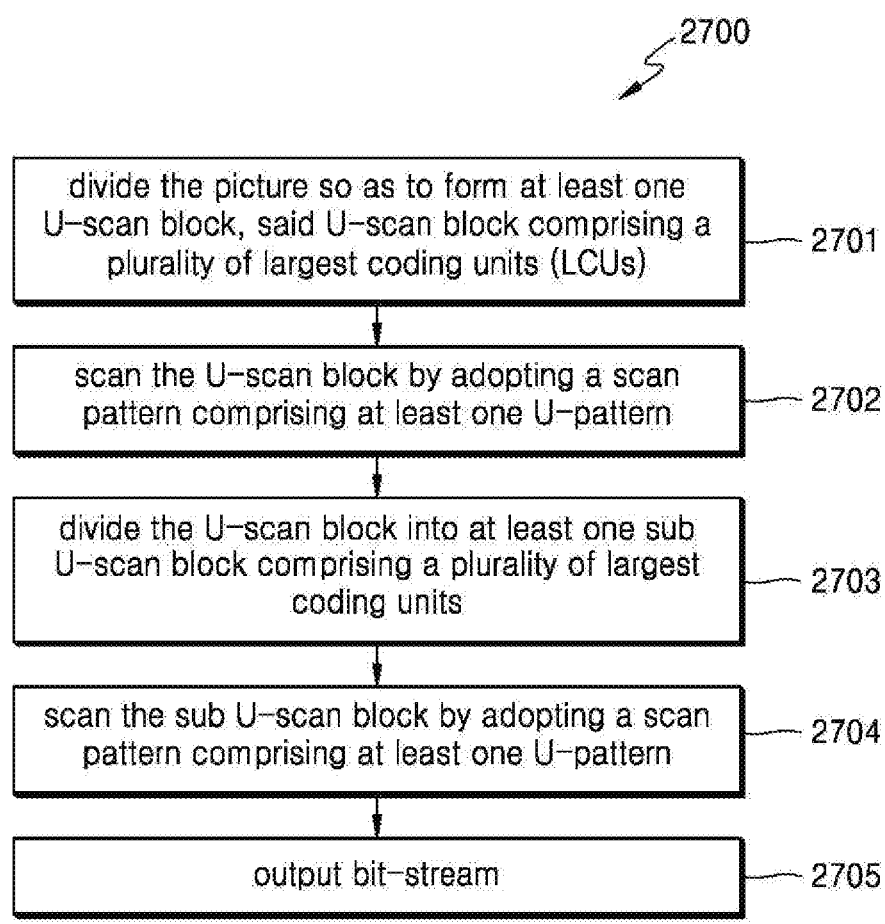
FIG. 27 is a flow diagram illustrating an exemplary method for encoding video, in accordance with another aspect of an example embodiment of present disclosure.

Upon negative determination, the method flows to block 2604 where the bit-stream is output. Further, FIG. 27 illustrates a flow diagram illustrating an exemplary method 2700 for encoding video, in accordance with another aspect of the embodiment of present disclosure. The order in which the method is described is not intended to be construed as a limitation, and any number of the described method blocks may be combined in any order to implement the method, or an alternative method. Additionally, individual blocks may be deleted from the method without departing from the spirit and scope of the subject matter described herein. Furthermore, the method may be implemented in any suitable hardware, software, firmware, or combination thereof.

At step 2701, an image is divided and at least one U-scan block is formed based on the divided image. The U-scan block may include a plurality of largest coding units (LCUs).

At step 2702, the U-scan block is scanned based on a scan pattern comprising at least one U-pattern.

At step 2703, the U-scan block is divided into at least one sub U-scan block. The at least one sub U-scan block may include a plurality of largest coding units.

At step 2704, the sub U-scan block is scanned based on the scan pattern including the at least one U-pattern.

At step 2705, a bit-stream is output.

Figure 31:
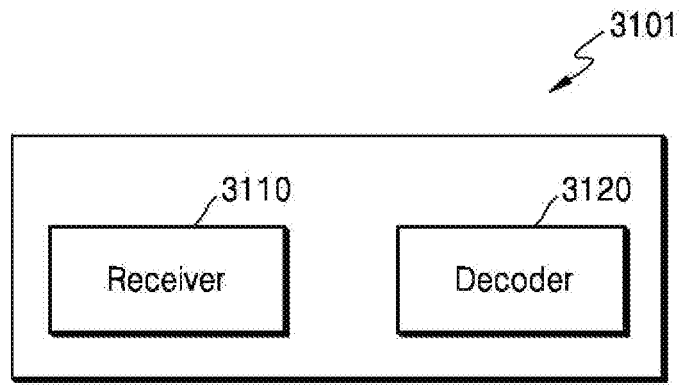
FIGS. 31, 32A and 32B schematically illustrate an exemplary video decoding apparatus, in accordance with an example embodiment of the present disclosure.
Figure 32A:
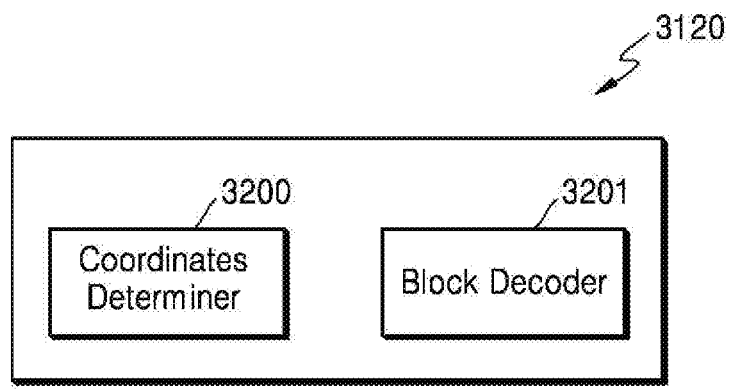
Figure 32B:
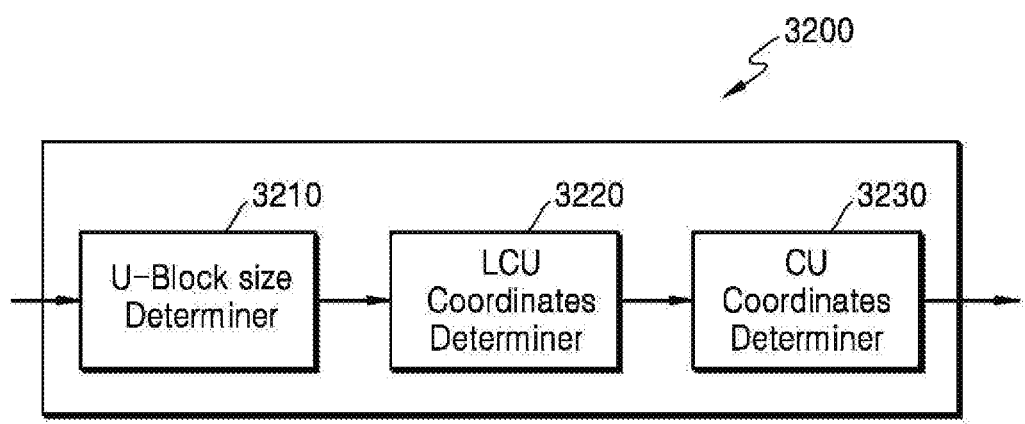

FIGS. 31, 32A and 32B schematically illustrate an exemplary video decoding apparatus, in accordance with an example embodiment of the present disclosure. The definitions of various terms for various operations of the decoder 2800 are identical to those described with reference to the encoder 1700 in reference to FIG. 17.

FIG. 31 schematically illustrates an example video decoding apparatus 3101 for decoding video or an image in accordance with an example embodiment of the present disclosure. The encoder 17 video decoding apparatus 3101 may include a receiver 3110 and a decoder 3120.

The receiver 3110 may receive a bit-stream including a plurality of data units encoded according to a scan pattern comprising at least one U-pattern. The image to be decoded may be encoded by the encoder 1700, where image data of the image is split into frames comprising of a plurality of coding units (CU) of maximum size and minimum depth, as described in reference to FIGS. 9 to 16. A maximum CU size is previously set in the encoder 1700. A depth (interchangeably referred to as depth value) is set as 1 for the CU having a size equal to the maximum size. The CU having a size equal to the maximum size is interchangeably referred to as largest coding unit (LCU) or maximum coding unit (maximum CU). In addition, a split flag indicative of split information is set as 1 for the LCU, so that the LCU is divided further into smaller CUs. Further, each of the LCUs may include deeper data units that are hierarchically split from the LCU according to varying depths. Since, the LCU is hierarchically split according to depths, the image data of a spatial domain included in the LCU may also be hierarchically classified according to depths.

The decoder 3120 may obtain information about a CU size limit, information about a maximum depth that limits a total number of height and width of the LCU that may be hierarchically split, and split flags of CUs in terms of depth from the bit-stream. The information about a size limit of CU may indicate one of a maximum CU size and a minimum size of CU. For example, when information about a minimum size of CU is obtained, the decoder may determine a maximum CU size based on the minimum size of CU and the maximum depth of CU. For example, when information about a maximum CU size is obtained, the decoder may determine a minimum size of CU based on the maximum CU size and the maximum depth of CU.

Thus, the decoder 3120 may determine an LCU among LCUs in the image by using the obtained information about the maximum CU size (the size of LCU), and determine data units according to depths that are hierarchically split from an LCU by using the obtained split flags of CUs.

The decoder 3120 may decode a data unit included among the plurality of data units by using at least one data unit included among the plurality of data units and decoded according to the scan pattern prior to the data unit.

The data unit may be either a CU, a prediction unit (PU), or a transformation unit (TU). The decoder 3120 may obtain, from the bit-stream, information about a partition type, information about a prediction mode, and information about a size of a TU for each LCU, as described in reference to FIGS. 9 to 11.

The decoder 3120 may decode CUs and LCUs sequentially according to a scan order including at least one U-pattern. The decoder 3120 may reconstruct a data cluster in an image by adopting the scan pattern. The U-pattern may be either an upright U-pattern or a rotated U-pattern, as described in reference to FIGS. 19 to 24.

The data cluster may be a U-scan block including a plurality of largest coding units (LCUs), and the data unit may a sub U-scan block including a coding unit (CU) or a prediction unit (PU) in an LCU among the plurality of LCUs.

For example, when a plurality of data units are included in a data cluster and the plurality of data units are scanned according to the U-pattern, the data unit is scanned and decoded, followed by a neighboring data unit horizontally or vertically adjacent to the data unit. When an image divided into a plurality of data clusters includes the data cluster, the plurality of data clusters are scanned according to the U-pattern, during which the data cluster is scanned and decoded, followed by a neighboring data cluster horizontally or vertically adjacent to the data cluster.

Referring to FIG. 32A, the decoder 3120 may include coordinates determiner 3200 and a block decoder 3201.

The coordinates determiner 3200 may determine coordinates of a data cluster in the current picture and data units within the data cluster. The coordinates determiner 3200 may determine coordinates of a data cluster or data units sequentially according to a scan order including at least one U-pattern. The U-pattern may be either an upright U-pattern or a rotated U-pattern, as described in reference to FIGS. 19 to 24.

The block decoder 3201 may scan a data cluster in the current picture and data units within the data cluster to search for available data units decoded prior to a current data unit, based on the coordinates determined by the coordinates determiner 3200. The data cluster may be either an LCU, a portion of the LCU, or a CU itself. The data unit may be either CU or PU.

Referring to FIG. 32B, the coordinates determiner 3200 may include a U-scan block size determiner 3210, an LCU coordinates determiner 3220, and a CU coordinates determiner 3230. As described earlier, a CU may be hierarchically split according to varying depths and scanned recursively using a U-pattern. Accordingly, the coordinates determiner 3200 receives the plurality of CUs split from an image.

The U-scan block size determiner 3210 may determine a U-scan block size based on information about U-scan block size, which is obtained from the bit-stream.

Thereafter, the LCU coordinates determiner 3220 may scan each U-block using a U-pattern starting from the top-left LCU. The LCU coordinates determiner 3220 may obtain a size of the each LCU within each U-block based on the information about a size limit of CU and the maximum depth. For example, the LCU coordinates determiner 3220 may determine coordinates of an LCU to be scanned next to the current LCU by adding the size of LCU to the coordinates of the current LCU. The LCU coordinates determiner 3220 may determine coordinates of LCUs within each U-block based on the sequential numbering or index of current LCUs inside the U-block in accordance with the U-pattern. The LCU coordinates determiner 3220 may then provide the coordinates of the current LCU to the CU coordinates determiner 3230.

The CU coordinates determiner 3230 may determine coordinates of a CU scanned first among CUs in the current LCU. Thus, the CU coordinates determiner 3230 may scan each sub U-block using a U-pattern starting from the top-left CU in the current LCU.

Further, the CU coordinates determiner 3230 may determine a size of each CU based on the split flag. For example, the CU coordinates determiner 3230 may determine coordinates of a next CU to be scanned next to a current CU by adding a size of the next CU to the coordinates of the current CU. The size of the next CU may be half of the size of the current CU. Thus, the CU coordinates determiner 3230 may determine coordinates of CUs within the LCU in accordance with the U-pattern.

Also, the decoder 3120 may use the coordinates determined by the coordinates determiner 3200 to reconstruct a CU, an LCU, and an image. For example, the decoder 3120 may group and arrange CUs in an LCU to reconstruct the LCU based on the coordinates of the CUs determined by the CU coordinates determiner 3230. The decoder 3120 may group and arrange LCUs in an image to reconstruct the image based on the coordinates of the LCUs determined by the LCU coordinates determiner 3220. Then the decoder 3120 may output a reconstructed picture decoded in CU-by-CU and LCU-by-LCU.

Figure 33:
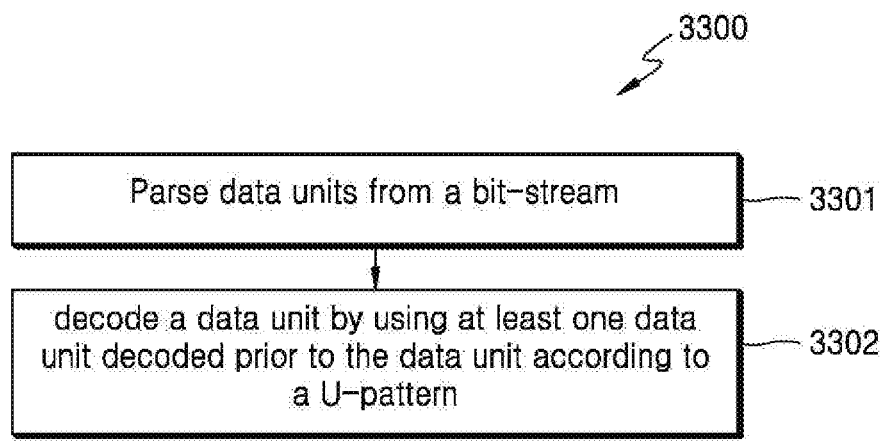
FIG. 33 is a flow diagram illustrating an exemplary video decoding method, in accordance with the embodiment of present disclosure.

FIG. 33 is a flow diagram illustrating an exemplary video decoding method, in accordance with an example embodiment of the present disclosure.

At step 3301, the video decoding apparatus 3101 may receive a bit-stream including a plurality of data units encoded according to a scan pattern including at least one U-pattern.

At step 3302, the video decoding apparatus 3101 may decode a data unit included among the plurality of data units by using at least one data unit included among the plurality of data units and decoded according to the scan pattern prior to the data unit.

The U-pattern may be one of an upright U-pattern and a rotated U-pattern. The scan pattern may include one or more upright U-patterns, one or more rotated U-patterns, or a combination thereof.

According to an example embodiment, when the upright U-pattern is adopted, the scan pattern may start from a top-left corner, "n" number of data units are scanned in a vertical downward direction; "m" number of data units are scanned in a horizontal rightward direction; and "n" number of coding units are scanned in a vertical upward direction ("n" is equal to 0 or 1, "m" is equal to 0 or 1 and "n" and "m" are not simultaneously 0).

According to another example embodiment, when the upright U-pattern is adopted, the scan pattern may start from a top-left corner, "n" number of data units are scanned in a vertical downward direction; "m" number of data units are scanned in a horizontal rightward direction; and "n" number of coding units are scanned in a vertical upward direction ("n" is equal to 0 or 1, "m" is equal to 0 or 1 and "n" and "m" are not simultaneously 0). If a split flag has been set or a PU mode has been set greater than 0, the data unit is scanned by adopting at least one U-pattern.

According to an example embodiment, when the rotated U-pattern is adopted, the scan pattern may start from a top-left corner, "a" number of coding units are scanned in a horizontal rightward direction; "b" number of coding units are scanned in a vertical downward direction; and "a" number of coding units are scanned in a horizontal leftward direction ("a" is equal to 0 or 1, "b" is equal to 0 or 1, and "a" and "b" are not 0, simultaneously).

According to another example embodiment, when the rotated U-pattern is adopted, the scan pattern may start from a top-left corner, "a" number of data units are scanned in a vertical downward direction; "b" number of data units are scanned in a horizontal rightward direction; and "a" number of coding units are scanned in a vertical upward direction ("a" is equal to 0 or 1, "b" is equal to 0 or 1 and "a" and "b" are not 0, simultaneously). If a depth of a data unit is greater than or equal to 2, the data unit is recursively scanned by adopting a U-pattern.

Figure 28:
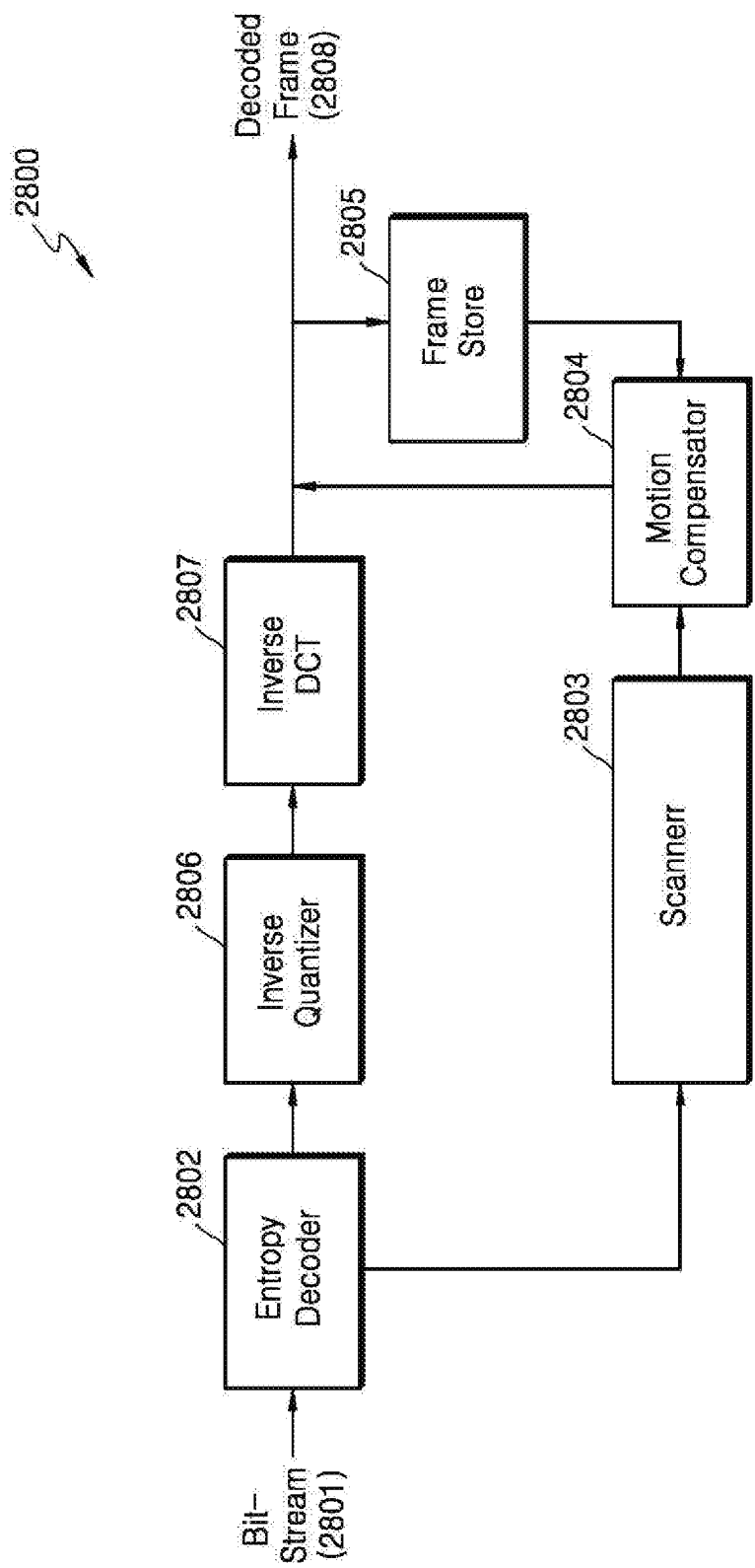
FIG. 28 schematically illustrates an example decoder for decoding video, in accordance with an example embodiment of the present disclosure.

FIG. 28 schematically illustrates an example decoder 2800 for decoding video, in accordance with an example embodiment of the present disclosure.

The decoder 2800 may include a receiver (not shown in FIG. 28) which may receive and parse a bit-stream 2801. The bit-stream is entropy decoded by an entropy decoder 2802. The entropy decoder 2802 may employ the entropy encoding scheme employed by the entropy encoder 1709 in the encoder 1700. An output from the entropy decoder 2802 is provided to a scanner 2803. The scanner 2803 may extract encoded data for each CU from the output, wherein the CUs have a hierarchical structure according to each LCU. The scanner 2803 may extract information about a maximum size of LCU of a current picture, from a header about the current picture and pattern information. In addition, the scanner 2803 may extract information about a coded depth and an encoding mode for the CUs having the hierarchical structure according to each LCU. Further, split information according to depths may be included in and extracted from the information about the coded depth. In addition, information about a partition type of a corresponding CU corresponding to the coded depth, a prediction mode, and a size of a TU is extracted from the encoding mode. Based on the extracted information, the encoded data in the bit stream 2801 is split into the LCUs for decoding.

Thereafter, the scanner 2802 may restore the current picture by decoding each LCU based on the extracted information. The scanner 2802 may decode an LCU by scanning the LCU and CUs within the LCU using a U-pattern, in a manner similar to the scanner 1701 in the encoder 1700.

A decoding process may include prediction including intra prediction and motion compensation, and inverse frequency transformation. Therefore, the decoder 2800 may perform intra prediction or motion compensation according to a partition and a prediction mode of each coding unit, based on the information about the partition type and the prediction mode of the prediction unit of the coding unit according to coded depths. Accordingly, output from the scanner 2802 may be provided to motion compensator 2804 for performing inter prediction. The motion compensator 2804 may perform motion compensation for decoded LCUs in an inter mode by using a reference frame stored in frame store buffer 2805. The motion compensator 2804 may again provide information to scanner 2803 to further split the CUs, in a manner similar to motion estimator 1704 providing CU information 1809 to the scanner 1701. The recursive splitting of the CUs may be continued until a maximum depth is obtained to decode the bit-steam 2801 in a manner similar to recursive splitting performed to encode a frame into the bit-stream.

Further, the decoder 2800 may perform inverse frequency transformation according to each TU in the CU based on the extracted information. Accordingly, the output from the entropy decoder 2801 is provided to an inverse quantizer 2806 to generate inverse quantized data. The inverse quantized data is restored to a decoded frame in a spatial domain through an inverse frequency transformation. Accordingly, the inverse quantized data is provided to an inverse frequency transformer 2807 to obtain a decoded frame 2808. The decoded frame 2808 may also be stored in the frame store buffer 2805 as a reference frame for decoding a subsequent encoded frame.

The decoder 2800 may perform operations of the video decoding apparatus 3101. Specifically, operations of the receiver (not shown in FIG. 28) may correspond to those of the receiver 3110 of the video decoding apparatus 3101. The decoder 3120 of the video decoding apparatus 3101 may perform operations of the entropy decoder 2802, the scanner 2803, the motion compensator 2804, the inverse quantizer 2806 and the inverse DCT 2807. A reconstructed picture decoded by the decoder 2800 may also be stored in a decoded picture buffer, such as the frame store buffer 2805, as a reference frame for decoding a subsequent encoded frame.

Figure 29:
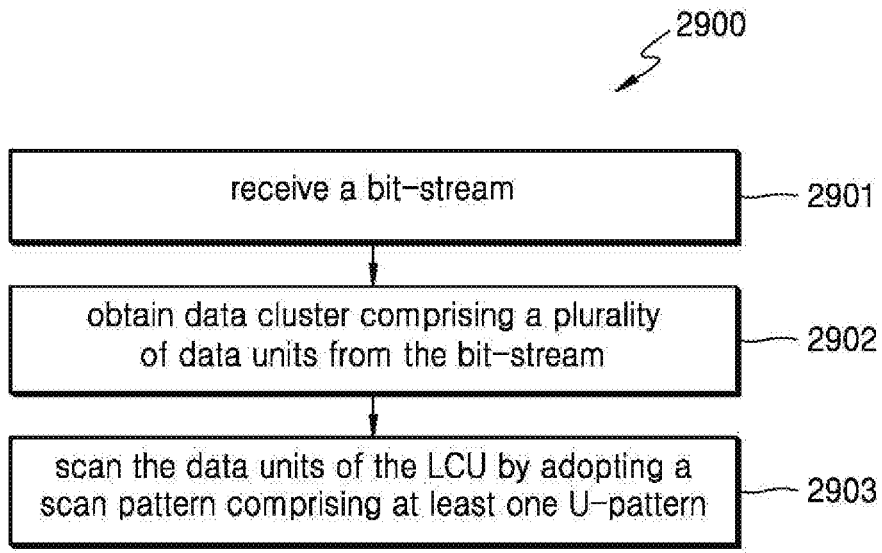
FIG. 29 is a flow diagram illustrating an exemplary method for decoding video, in accordance with one aspect of an example embodiment of present disclosure.

Further, FIG. 29 illustrates a flow diagram illustrating an exemplary method 2900 for decoding video, in accordance with one aspect of the embodiment of present disclosure. The order in which the method is described is not intended to be construed as a limitation, and any number of the described method blocks may be combined in any order to implement the method, or an alternative method. Additionally, individual blocks may be deleted from the method without departing from the spirit and scope of the subject matter described herein. Furthermore, the method may be implemented in any suitable hardware, software, firmware, or combination thereof.

At step 2901, a bit-stream is received.

At step 2902, a data cluster comprising a plurality of data units is obtained from the bit-stream. The data cluster may be either a largest coding unit (LCU), a portion of an LCU, or a coding unit (CU). The data unit is either a coding unit (CU) or a prediction unit (PU).

At step 2903, the data units of the LCU are scanned by adopting a scan pattern comprising at least one U-pattern. The U-pattern may be either an upright U-pattern or a rotated U-pattern. The scan pattern may include one or more upright U-patterns, one or more rotated U-patterns, or a combination thereof. The data units may each have a depth value in the range of 1 to N, wherein N is an integer.

Figure 30:
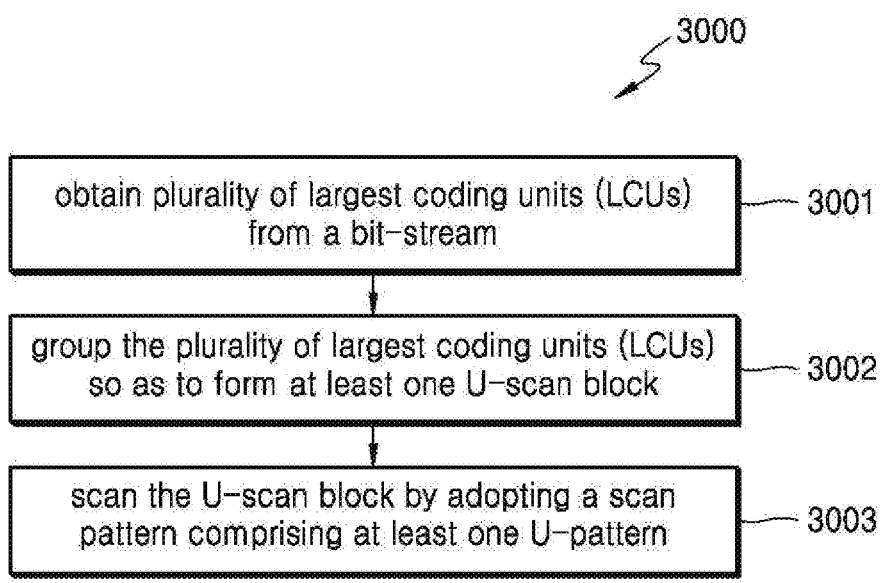
FIG. 30 is a flow diagram illustrating an exemplary method for decoding video, in accordance with another aspect of an example embodiment of present disclosure.

Further, FIG. 30 illustrates a flow diagram illustrating an exemplary method 3000 for encoding video, in accordance with another aspect of the embodiment of present disclosure. The order in which the method is described is not intended to be construed as a limitation, and any number of the described method blocks may be combined in any order to implement the method, or an alternative method. Additionally, individual blocks may be deleted from the method without departing from the spirit and scope of the subject matter described herein. Furthermore, the method may be implemented in any suitable hardware, software, firmware, or combination thereof.

At step 3001, plurality of largest coding units (LCUs) are obtained from a bit-steam.

At step 3002, the plurality of largest coding units (LCUs) are grouped so as to form at least one U-scan block.

At step 3001, the U-scan block is scanned by adopting a scan pattern including at least one U-pattern.

While certain present preferred embodiments of the present disclosure have been illustrated and described herein, it is to be understood that the present disclosure is not limited thereto. Clearly, the present disclosure may be otherwise variously embodied, and practiced within the scope of the following claims.

What is claimed:

1. A method in a video decoder, the method comprising:
receiving a bit-stream including a plurality of data units encoded according to a scan pattern comprising at least one U-pattern; and
decoding a data unit included among the plurality of data units by using at least one other data unit included among the plurality of data units, the at least one other data unit being decoded prior to the data unit according to the scan pattern,
wherein, when the plurality of data units are included in a data cluster, the method includes scanning the plurality of data units according to the at least one U-pattern, and the scanning includes scanning and decoding the data unit, followed by scanning and decoding a neighboring data unit horizontally or vertically adjacent to the data unit,
wherein, when an image divided into a plurality of data clusters includes the data cluster, the method includes scanning the plurality of data clusters according to the at least one U-pattern, the data cluster is scanned and decoded, followed by a neighboring data cluster horizontally or vertically adjacent to the data cluster,
wherein the at least one U-pattern includes an upright U-pattern or a rotated U-pattern, and each of the upright U-pattern and the rotated U-pattern scans each of the plurality of the data units once, changing direction, and
wherein, when the at least one U-pattern includes the upright U-pattern, the scanning comprises:
starting from a top-left corner, scanning "n" number of data units in a vertical downward direction,
scanning "m" number of data units in a horizontal rightward direction, and
after scanning in the horizontal rightward direction, scanning "n" number of coding units in a vertical upward direction,
wherein "n" is equal to 0 or 1, "m" is equal to 0 or 1, and "n" and "m" are not simultaneously.

2. The method of claim 1, wherein when the at least one U-pattern includes the upright U-pattern, the scanning of the plurality of data units and the scanning of the plurality of data clusters comprises:
starting from a top-left corner, scanning "n" number of data units in a vertical downward direction;
scanning "m" number of data units in a horizontal rightward direction; and
after scanning in the horizontal rightward direction, scanning "n" number of coding units in a vertical upward direction,
wherein "n" is equal to 0 or 1, "m" is equal to 0 or 1 and "n" and "m" are not simultaneously 0, and
wherein, the scanning of the plurality of data units and the scanning of the plurality of data clusters further comprises scanning at least one of the plurality of data units according to the at least one U-pattern if a split flag has been set for the at least one data unit or a prediction unit (PU) mode has been set greater than 0 for the at least one data unit.

3. The method of claim 1, wherein, when the at least one U-pattern includes the rotated U-pattern, the scanning of the plurality of data units and the scanning of the plurality of data clusters comprises:
starting from a top-left corner, scanning "a" number of coding units in a horizontal rightward direction;
scanning "b" number of coding units in a vertical downward direction; and
after scanning in the vertical downward direction, scanning "a" number of coding units in a horizontal leftward direction,
wherein "a" is equal to 0 or 1, "b" is equal to 0 or 1, and "a" and "b" are not simultaneously 0.

4. The method of claim 1, wherein, when the at least one U-pattern includes the rotated U-pattern, the scanning of the plurality of data units and the scanning of the plurality of data clusters comprises:
starting from a top-left corner, scanning "a" number of data units in a horizontal rightward direction;
scanning "b" number of data units in a vertical downward direction; and after scanning in the vertical downward direction, scanning "a" number of coding units in a horizontal leftward direction, wherein "a" is equal to 0 or 1, "b" is equal to 0 or 1, and "a" and "b" are not simultaneously 0, and wherein the scanning of the plurality of data units includes recursively scanning, according to the at least one U-pattern, any data units included among the plurality of data units and having a depth greater than or equal to 2.

5. The method of claim 1, wherein the data cluster is a U-scan block comprising a plurality of largest coding units (LCUs), and the data unit is a sub U-scan block comprising a coding unit (CU) or a prediction unit (PU) in a largest coding unit among the plurality of largest coding units.

6. An apparatus decoding video, the apparatus comprising:

a receiver configured to receive a bit-stream including a plurality of data units encoded according to a scan pattern comprising at least one U-pattern; and a decoder configured to decode a data unit included among the plurality of data units by using at least one other data unit included among the plurality of data units, the at least one other data unit being decoded prior to the data unit according to the scan pattern, wherein, when the plurality of data units are included in a data cluster, the decoder scans the plurality of data units according to the at least one U-pattern, and scans and decodes the data unit, followed by scanning and decoding a neighboring data unit horizontally or vertically adjacent to the data unit, wherein, when an image divided into a plurality of data clusters includes the data cluster, the decoder scans and decodes the plurality of data clusters according to the U-pattern, the data cluster is scanned and decoded, followed by a neighboring data cluster horizontally or vertically adjacent to the data cluster, wherein the at least one U-pattern includes an upright U-pattern or a rotated U-pattern, and each of the upright U-pattern and the rotated U-pattern scans each of the plurality of the data units once, changing direction, and wherein, when the at least one U-pattern includes the upright U-pattern, the scanning comprises:

starting from a top-left corner, scanning "n" number of data units in a vertical downward direction, scanning "m" number of data units in a horizontal rightward direction, and after scanning in the horizontal rightward direction, scanning "n" number of coding units in a vertical upward direction, wherein "n" is equal to 0 or 1, "m" is equal to 0 or 1, and "n" and "m" are not simultaneously 0.

7. The apparatus of claim 6, wherein, when the at least one U-pattern includes the upright U-pattern, the scanning of the plurality of data units and the scanning of the plurality of data clusters comprises:

starting from a top-left corner, scanning "n" number of data units in a vertical downward direction;

scanning "m" number of data units in a horizontal rightward direction; and after scanning in the horizontal rightward direction, scanning "n" number of coding units in a vertical upward direction, wherein "n" is equal to 0 or 1, "m" is equal to 0 or 1, and "n" and "m" are not simultaneously 0, and wherein, the scanning of the plurality of data units and the scanning of the plurality of data clusters further comprises scanning at least one of the plurality of data units according to the at least one U-pattern if a split flag has been set for the at least one data unit or a prediction unit (PU) mode has been set greater than 0 for the at least one data unit.

8. The apparatus of claim 6, wherein when the at least one U-pattern includes the rotated U-pattern, the scanning of the plurality of data units and the scanning of the plurality of data clusters comprises:

starting from a top-left corner, scanning "a" number of coding units in a horizontal rightward direction;

scanning "b" number of coding units in a vertical downward direction; and after scanning in the vertical downward direction, scanning "a" number of coding units in a horizontal leftward direction, wherein "a" is equal to 0 or 1, "b" is equal to 0 or 1, and "a" and "b" are not simultaneously 0.

9. The apparatus of claim 6, wherein, when the at least one U-pattern includes the rotated U-pattern, the scanning of the plurality of data units and the scanning of the plurality of data clusters comprises:

starting from a top-left corner, scanning "a" number of coding units in a horizontal rightward direction;

scanning "b" number of coding units in a vertical downward direction; and after scanning in the vertical downward direction, scanning "a" number of coding units in a horizontal leftward direction, wherein "a" is equal to 0 or 1, "b" is equal to 0 or 1, and "a" and "b" are not simultaneously 0, and wherein the scanning of the plurality of data units includes recursively scanning, according to the at least one U-pattern, any data units included among the plurality of data units and having a depth greater than or equal to 2.

10. The apparatus of claim 6, wherein the data cluster is a U-scan block comprising a plurality of largest coding units (LCUs), and the data unit is a sub U-scan block comprising a coding unit (CU) or a prediction unit (PU) in a largest coding unit among the plurality of largest coding units.

11. A method in a video encoder, the method comprising:

dividing an image and forming at least one U-scan block based on the divided image, the U-scan block comprising a plurality of largest coding units (LCUs); and scanning the U-scan block based on a scan pattern comprising at least one U-pattern, wherein the scan pattern includes an upright U-pattern or a rotated U-pattern, and each of the upright U-pattern and the rotated U-pattern scans U-scan block once, changing direction, and wherein, when the scan pattern includes the upright U-pattern, the scanning comprises:

starting from a top-left corner, scanning "n" number of the LCUs in a vertical downward direction, scanning "m" number of the LCUs in a horizontal rightward direction, scanning "n" number of the LCUs in a vertical upward direction, and wherein "n" is an integer and "m" is equal to 1.

12. The method of claim 11, further comprising dividing the U-scan block into at least one sub U-scan block including a plurality of LCUs and scanning the at least one sub U-scan block based on the scan pattern comprising the at least one U-pattern.

13. The method of claim 11, wherein, when the scan pattern includes the rotated U-pattern, the scanning of the U-scan block comprises:
   starting from a top-left corner, scanning "a" number of the LCUs in a horizontal rightward direction;
   scanning "b" number of the LCUs in a vertical downward direction;
   scanning "a" number of the LCUs in a horizontal leftward direction; and
   wherein "a" is an integer and "b" is equal to 1.

14. The method of claim 11, wherein the image comprises one or more LCUs not included in the at least one U-scan block.

15. The method of claim 12, wherein the image comprises one or more LCUs not included in the at least one U-scan block.

* * * * *